United States Patent
Hill

(10) Patent No.: US 10,254,728 B2
(45) Date of Patent: Apr. 9, 2019

(54) AUTOMATED FLOOD IRRIGATION SYSTEM AND METHOD OF USING THE SAME

(71) Applicant: Thomas S. Hill, Cedarville, CA (US)

(72) Inventor: Thomas S. Hill, Cedarville, CA (US)

(*) Notice: Subject to any disclaimer, the term of this patent is extended or adjusted under 35 U.S.C. 154(b) by 0 days.

(21) Appl. No.: 14/828,053

(22) Filed: Aug. 17, 2015

(65) Prior Publication Data

US 2016/0048135 A1 Feb. 18, 2016

Related U.S. Application Data

(60) Provisional application No. 62/037,960, filed on Aug. 15, 2014.

(51) Int. Cl.
| | | |
|---|---|---|
| A01G 25/00 | (2006.01) | |
| A01G 25/16 | (2006.01) | |
| G05B 19/042 | (2006.01) | |
| G05D 7/06 | (2006.01) | |

(52) U.S. Cl.
CPC .......... *G05B 19/042* (2013.01); *A01G 25/00* (2013.01); *A01G 25/167* (2013.01); *G05B 2219/2625* (2013.01)

(58) Field of Classification Search
CPC ..... G05B 19/042; A01G 25/00; A01G 25/167
See application file for complete search history.

(56) References Cited

U.S. PATENT DOCUMENTS

| | | | | |
|---|---|---|---|---|
| 3,689,025 | A * | 9/1972 | Kiser | F16K 7/16 137/906 |
| 3,982,400 | A | 9/1976 | Benkert | |
| 3,995,435 | A | 12/1976 | Waterston | |
| 4,073,147 | A * | 2/1978 | Nomura | E02B 7/44 405/100 |
| 4,699,354 | A * | 10/1987 | Gibson | F16K 31/1262 137/269 |
| 5,002,428 | A | 3/1991 | Shettel | |
| 5,749,521 | A | 5/1998 | Lattery | |
| 6,311,949 | B1 * | 11/2001 | Iida | E02B 7/36 137/510 |
| 7,121,577 | B2 | 10/2006 | Perez | |
| 8,183,719 | B2 | 5/2012 | Scripea et al. | |
| 8,793,024 | B1 * | 7/2014 | Woytowitz | B05B 12/02 137/78.2 |
| 9,301,461 | B2 * | 4/2016 | Woytowitz | A01G 25/16 |
| 2002/0066484 | A1 * | 6/2002 | Stringam | A01G 25/16 137/392 |
| 2003/0026659 | A1 * | 2/2003 | Wu | E02B 7/30 405/87 |

(Continued)

OTHER PUBLICATIONS

Pfitscher et al.; An Automated Irrigation System for Rice Cropping with Remote Supervision; May 2011; All (Year: 2011).*

(Continued)

*Primary Examiner* — Benjamin F Fiorello
(74) *Attorney, Agent, or Firm* — Aspire IP, LLC; Yiu F. Au

(57) ABSTRACT

A method for flood irrigation includes releasing water from a riser valve for flooding a portion of a field through a control of a corresponding riser device of a plurality of riser devices, wherein the corresponding riser device is deployed at a location proximate to the riser valve, receiving a wireless signal from a corresponding sensor device of a plurality of sensor devices for a detection of a flood condition, wherein the corresponding sensor device is deployed at a location proximate to where the water from the riser valve is expected to flood; and stopping the release of the water from the riser valve.

20 Claims, 23 Drawing Sheets

(56) References Cited

U.S. PATENT DOCUMENTS

| | | | | |
|---|---|---|---|---|
| 2007/0016334 | A1* | 1/2007 | Smith | A01G 25/16 700/284 |
| 2007/0289213 | A1* | 12/2007 | Van Geest | A01G 9/247 47/62 C |
| 2011/0121982 | A1* | 5/2011 | Hansen | G08B 5/36 340/604 |
| 2014/0191145 | A1* | 7/2014 | Aughton | E02B 7/42 251/213 |
| 2015/0361630 | A1* | 12/2015 | Appelboom | E02B 7/28 405/104 |

OTHER PUBLICATIONS

Miskam et al.; Fully Automatic Water Irrigation and Drainage System for Paddy Rice Cropping in Malaysia; Aug. 2013; All (Year: 2013).*

Pfitscher et al.; Energy Saving Technology on Irrigation System for Rice Cropping; Sep. 2011; All (Year: 2011).*

AWMA Water Control Solutions, "i-Driver Motorised Automation Head Unit", Nov. 2015, 2 pages.

AWMA, "i-Riser Rising Above the Rest", Nov. 2015, 2 pages.

Costelow, "Mitigating Pipe and Riser Hydraulic Pipeline Issues with the I-Riser Plus," Business Development Consultant—AWMA Water Control Solutions, Jul. 24, 2013; 7 pages.

U.S. Department of Agriculture Soil Conservation Service, " Irrigation Guide for the Shasta Valleys and Basins", SCS-320, May 1962, 4 pages.

Saha, et al., "Water sensors with cellular system eliminate tail water drainage in alfalfa irrigation," California Agriculture, vol. 65, No. 4, Oct.-Dec. 2011, 6 pages.

Erie, et al., "Automation of an Open-Ditch Irrigation Conveyance System Utilizing Tile Outlets", Transactiosn of the ASAE, vol. 21, No. 1, pp. 119-123, 1978.

* cited by examiner

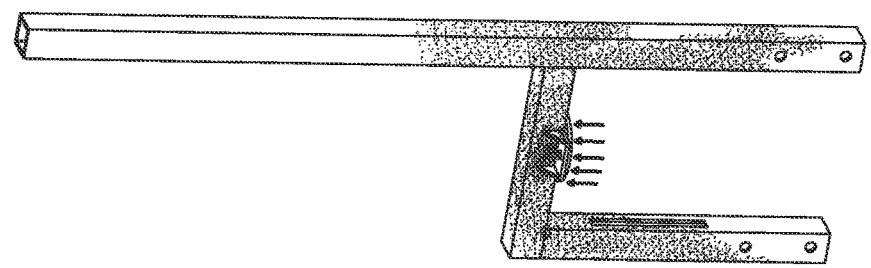
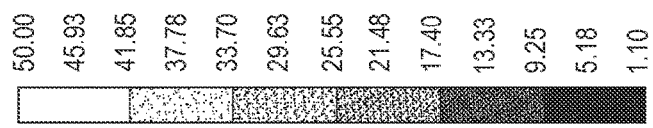
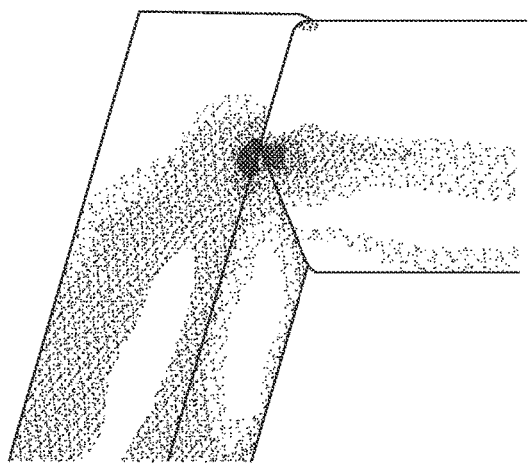
FIG. 3E
FIG. 3F

AUTOMATED FLOOD IRRIGATION SYSTEM AND METHOD OF USING THE SAME

CROSS REFERENCE TO RELATED APPLICATION

The present application is claims the benefits of and priority, under 35 U.S.C. § 119(e), to U.S. Provisional Application Ser. No. 62/037,960, filed Aug. 15, 2014; the above-identified application being fully incorporated herein by reference.

COMPUTER PROGRAM LISTING APPENDIX

A computer program listing appendix containing the source code of computer programs that may be used with the present invention is incorporated by reference in its entirety and appended to this application as one (1) original compact disc, and one (1) identical copy thereof, containing a total of twenty-four (24) files as follows:

| Filename | Size (bytes) | Date of Creation |
| --- | --- | --- |
| Riser_1.ino | 8,813 | Apr. 15, 2015 |
| Riser_2.ino | 9,016 | Apr. 15, 2015 |
| Riser_3.ino | 9,016 | Apr. 15, 2015 |
| Riser_4.ino | 9,016 | Apr. 15, 2015 |
| Riser_5.ino | 9,016 | Apr. 15, 2015 |
| Riser_6.ino | 9,016 | Apr. 15, 2015 |
| Riser_7.ino | 9,016 | Apr. 15, 2015 |
| Riser_8.ino | 9,016 | Apr. 15, 2015 |
| Riser_9.ino | 9,017 | Apr. 15, 2015 |
| Riser_10.ino | 9,019 | Apr. 15, 2015 |
| Riser_11.ino | 9,150 | Apr. 15, 2015 |
| Riser Code.ino | 22,483 | Aug. 15, 2015 |
| Sensor_1.ino | 3,788 | Aug. 15, 2015 |
| Sensor_2.ino | 3,788 | Aug. 15, 2015 |
| Sensor_3.ino | 3,788 | Aug. 15, 2015 |
| Sensor_4.ino | 3,788 | Aug. 15, 2015 |
| Sensor_5.ino | 3,788 | Aug. 15, 2015 |
| Sensor_6.ino | 3,788 | Aug. 15, 2015 |
| Sensor_7.ino | 3,788 | Aug. 15, 2015 |
| Sensor_8.ino | 3,788 | Aug. 15, 2015 |
| Sensor_9.ino | 3,789 | Aug. 15, 2015 |
| Sensor_10.ino | 3,792 | Aug. 15, 2015 |
| Sensor_11.ino | 3,311 | Aug. 15, 2015 |
| Sensor Code.ino | 630 | Aug. 15, 2015 |

BACKGROUND OF THE INVENTION

Field of the Invention

The invention generally relates to an automated flood irrigation system, and more particularly to a method and system for automatic flood irrigation using sensors and communication system.

DISCUSSION OF THE BACKGROUND

Irrigating crops as efficiently as possible is a primary objective for farmers in the 21st century. Flood irrigation is a prominent form of irrigation utilized in the agricultural industry. Several different irrigation methods exist in modern agriculture, including wheel lines, center pivot systems, sprinkler systems, and surface or flood irrigation.

The significant options on the market for irrigating large sections of land are both sprinkler forms. One method utilizes wheel lines and the other utilizes center pivot systems. These two forms are very costly and have high evaporative losses.

For example, wheel lines are effective at watering large areas that have not had thorough ground preparation. However, they are expensive to implement and they also experience large volumes of water evaporating before the water reaches the ground. Center pivot lines are capable of very uniform watering, but must travel in a circle, which leaves part of the field unusable.

Flood irrigation is a technique for irrigating that involves the flooding over a specific graded field, which allows water to permeate all sections of the field. Many methods and structures for irrigating land have been developed. These methods and structures include measuring gate, turnout, border takeout, division box, canvas check, parshall flume, drop, contour ditch, low pressure pipe line, gated pipe, and concrete lined ditch check, drop, and takeout.

Specifically, in various approaches, the water may flow from a supply (e.g., canal, riser) to the areas to be irrigated through a gradient of the land. For example, in the graded border, each piece of land is separated by a border, and the water flows from the supply at a higher end of the land to the lower end of the land when the water is released.

Flood irrigation presents several strengths, which include low cost operation, low evaporation losses, as well as simplicity in design. On the other hand, surface irrigation methods require many hours of labor since the water level must be monitored by someone who manually turns the water valves on and off, as needed.

A good farm irrigation system should efficiently perform functions such as deliver water to all parts of the farm when needed, deliver water in amounts needed to meet crop demands during peak use periods, provide complete control of water, measure the amount of water at entry into farm irrigation system, divide water in required amounts for use in different fields, dispose of waste water, provide for reuse of water on the farm, allow free, easy movement of farm machinery, and distribute water evenly into the soil of each field.

For example, one may control the supply of water into each piece of land by controlling the water supply (i.e., risers, gates) to limit the amount of land that is irrigated at one time (i.e., to ensure water delivery at the correct amount). In existing pipe and riser systems in use, one must manually control the flow of water into each piece of land, especially for systems in the family farming context.

SUMMARY OF THE INVENTION

There is a need for an automated flood irrigation system that addresses the deficiencies and problems in the related art.

One advantage of an embodiment of the present invention is to promote the sustainability of water management on a worldwide scale. One deficiency with the related art is that they are very labor intensive and requires a paid employee to continuously check on the progress of water advancement for days at a time. The efficiency of a flood irrigation system may be improved by automating the surface irrigation process.

Another advantage of an embodiment of the present invention is to make the process of surface irrigation less labor intensive, and, as such, would cut costs and further promote the conservation of water. In the related art, risers are open and closed manually by unscrewing a lid or gate. As such, labor is required to release and to stop the release of water. Timing of the release and the stop release of the water may lead to unnecessary water run-off (e.g., due to a delay of closure of the lid to stop the release of the water after the surface has been irrigated). In an embodiment, this process will be made easier by allowing the user to open the water line at the push of a button. A sensor will be placed at the end of the field and will report back to the riser when the water has reached the end, signaling the riser to shut off. A networked flood irrigation system, consisting of a collection of risers and sensors, will further provide a stand-alone solution to the problem.

Yet another advantage of an embodiment of the present invention includes a control system for facilitating flood valve automation. This control system interprets signals from a wireless sensor node, and subsequently controls a flood valve. A gas powered air spring was chosen to open and close the valve. Mounted directly to the riser, and supplied with pressurized gas from a pressure vessel, the air spring controls the flow of water by inflating and deflating.

A further advantage of an embodiment of the present invention is to provide a system and method that automates various processes of flood irrigation, e.g. automated electronics and sensors for activating, deactivating, scheduling and performing maintenance, and other automated tasks.

Another further advantage of an embodiment of the present invention is to provide an automated flood irrigation system that facilitates the conservation and equitable use of the water supply and to prevent unnecessary run-offs.

Another advantage of an embodiment of the present invention is to provide a system and method for automated flood irrigation that could modify and work with existing manual systems.

To achieve these and other advantages, as embodied and broadly described, a riser assembly includes a support structure, an actuation mechanism coupled to the support structure for opening and closing a lid assembly. The lid assembly impedes a flow of water from a riser valve in a closed position and releases the flow of water from the riser valve in an opened position. The riser assembly further includes an electronic control for controlling the actuation mechanism to open and close the lid assembly. The electronic control includes a processor and a wireless communication interface. The wireless communication interface is configured to receive a signal from a corresponding sensor assembly when the corresponding sensor assembly senses a flood condition to control the actuation mechanism to close the lid assembly. The riser assembly further includes a power supply. The actuation mechanism comprises one of a compressed gas mechanism and an electromechanical mechanism. The compressed gas mechanism comprises a compressed gas vessel, a gas regulator, and an air spring, wherein the air spring compresses to open the lid assembly and decompresses to close the lid assembly. The gas regulator includes a solenoid, the solenoid controlling a path of gas from the compressed vessel for compressing or decompressing the air spring. The electromechanical mechanism comprises one of a solenoid mechanism and a scissor jack mechanism. A flood irrigation system includes the riser assembly and the corresponding sensor assembly. The riser assembly is deployed at a location proximate to the riser valve and the sensor assembly is deployed at a location proximate to where water from the riser valve is expected to flood.

In another embodiment, a flood irrigation system includes a plurality of riser devices and a plurality of corresponding sensor devices each in wireless communication with one of the riser device. Each of the riser device is deployed at a location proximate to a riser valve and configured to release water from the riser valve for flooding a portion of a field. The corresponding sensor device is deployed at a location proximate to where the water from the riser valve is expected to flood. The corresponding sensor device is configured to send a wireless signal to the riser device that the corresponding sensor device is in wireless communication with to stop releasing the water when the corresponding sensor device sensors a flood condition. At least one of the riser devices is in wireless communication with at least another one of the riser devices, and the one riser device is configured to send a wireless signal to the another one riser device to release water from the riser valve corresponding to the another one riser device when the one riser device stops releasing the water. The another one riser device is in wireless communication with a second one of the riser devices, and wherein the another one riser device is configured to send a wireless signal to the second one riser device to release water from the riser valve corresponding to the second one riser device when the another one riser device stops releasing the water in accordance to a pre-determined pattern. Each of the riser devices includes a support structure an actuation mechanism coupled to the support structure for opening and closing a lid assembly. The lid assembly impedes a flow of water from the riser valve corresponding to the riser device in a closed position and releases the flow of water from the riser valve in an opened position. Each of the riser devices further includes an electronic control for controlling the actuation mechanism to open and close the lid assembly. The electronic control includes a processor and a wireless communication interface. The wireless communication interface is configured to receive the wireless signal from the corresponding sensor device. The actuation mechanism comprises a compressed gas vessel, a gas regulator, and an air spring, wherein the air spring compresses to open the lid assembly and decompresses to close the lid assembly. The gas regulator includes a solenoid, the solenoid controlling a path of gas from the compressed gas vessel for compressing or decompressing the air spring.

In yet another embodiment, a method for flood irrigation includes releasing water from a riser valve for flooding a portion of a field through a control of a corresponding riser device of a plurality of riser devices. The corresponding riser device is deployed at a location proximate to the riser valve. The method further includes receiving a wireless signal from a corresponding sensor device of a plurality of sensor devices for a detection of a flood condition. The corresponding sensor device is deployed at a location proximate to where the water from the riser valve is expected to flood. The method further includes stopping the release of the water from the riser valve. The method further includes sending a wireless signal from the corresponding riser device to a second one of the plurality of riser devices to control a release of water from a riser valve corresponding to the second one riser device. The method further includes sending a wireless signal from the second one riser device to a third one of the plurality of riser devices to control a release of water from a riser valve corresponding to the third one riser device a plurality of riser devices after the second one riser device has stopped the release of water from the riser valve corresponding to the second one riser device, wherein the third one riser device is determined based on a pre-determined pattern. The pre-determined pattern comprises a sequence starting from a first one of the riser devices to a last one of the riser devices. Each of the riser devices includes a support structure and an actuation mechanism coupled to the support structure for opening and closing a lid assembly. The lid assembly impedes a flow of water from the riser valve corresponding to the riser device in a closed position and releases the flow of water from the riser valve in an opened position. Each of the riser devices further includes an electronic control for controlling the actuation mechanism to open and close the lid assembly. The electronic control includes a processor and a wireless communication interface. The wireless communication interface is configured to receive the wireless signal from the corresponding sensor device. The actuation mechanism comprises a compressed gas vessel, a gas regulator, and an air spring, wherein the air spring compresses to open the lid assembly and decompresses to close the lid assembly. The gas regulator includes a solenoid, the solenoid controlling a path of gas from the compressed gas vessel for compressing or decompressing the air spring.

The present disclosure can provide a number of advantages depending on the particular aspect, embodiment, and/or configuration. These and other advantages will be apparent from the disclosure. Additional features and advantages may be learned by the practice of the invention.

BRIEF DESCRIPTION OF THE DRAWINGS

FIGS. 3A-3F illustrate exemplary structural analyses of a riser assembly of a flood irrigation system according to an embodiment;

Figure 1:
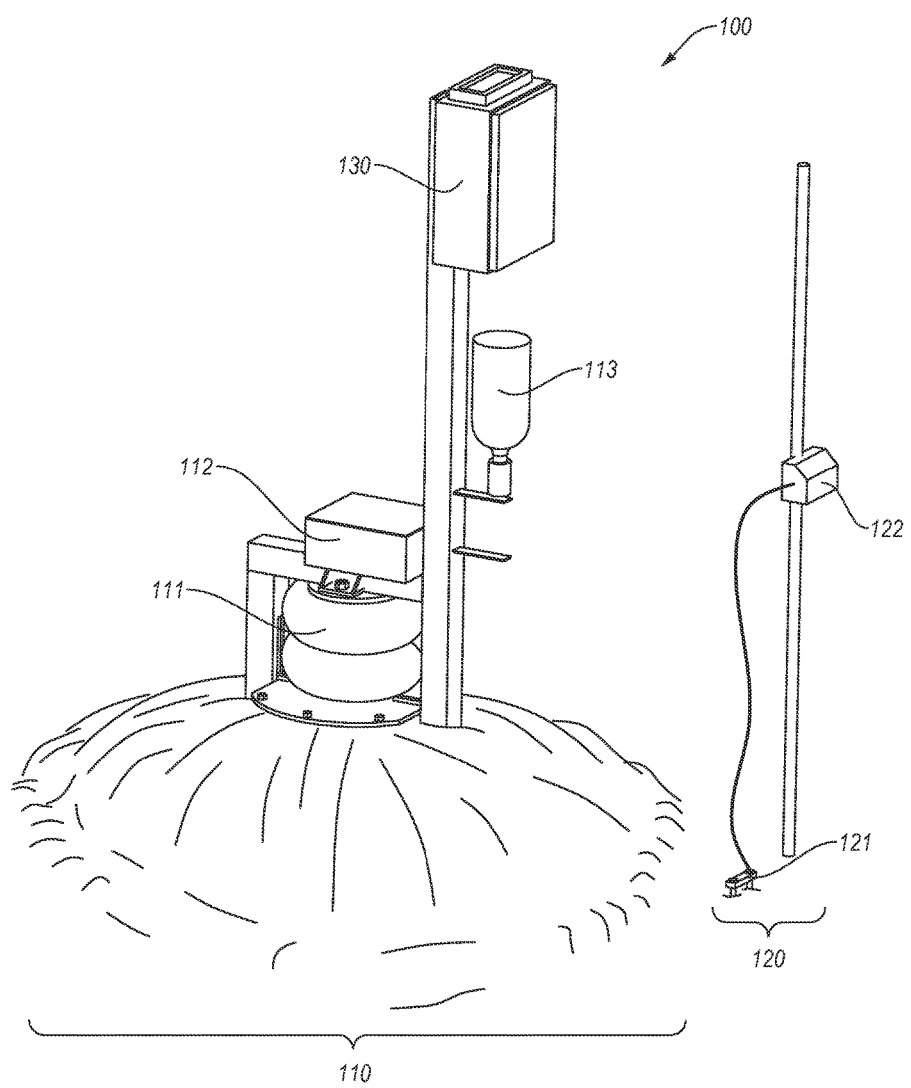
FIG. 1 illustrates an exemplary flood irrigation system according to an embodiment.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The present disclosure can provide a number of advantages depending on the particular aspect, embodiment, and/or configuration. These and other advantages will be apparent from the disclosure.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C." "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "module." as used herein, refers to any known or later developed hardware, software, firmware, artificial intelligence, fuzzy logic, or combination of hardware and software that is capable of performing the functionality associated with that element.

The terms "determine," "calculate," and "compute." and variations thereof, as used herein, are used interchangeably and include any type of methodology, process, mathematical operation or technique.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible, utilizing, alone or in combination, one or more of the features set forth above or described in detail below.

Embodiments herein presented are not exhaustive, and further embodiments may be now known or later derived by one skilled in the art.

Functional units described in this specification and figures may be labeled as modules, or outputs in order to more particularly emphasize their structural features. A module and/or output may be implemented as hardware, e.g., comprising circuits, gate arrays, off-the-shelf semiconductors such as logic chips, transistors, or other discrete components. They may be fabricated with Very-large-scale integration (VLSI) techniques. A module and/or output may also be implemented in programmable hardware such as field programmable gate arrays, programmable array logic, programmable logic devices or the like. Modules may also be implemented in software for execution by various types of processors. In addition, the modules may be implemented as a combination of hardware and software in one embodiment.

An identified module of programmable or executable code may, for instance, include one or more physical or logical blocks of computer instructions that may, for instance, be organized as an object, procedure, or function. Components of a module need not necessarily be physically located together but may include disparate instructions stored in different locations which, when joined logically together, include the module and achieve the stated function for the module. The different locations may be performed on a network, device, server, and combinations of one or more of the same. A module and/or a program of executable code may be a single instruction, or many instructions, and may even be distributed over several different code segments, among different programs, and across several memory devices. Similarly, data or input for the execution of such modules may be identified and illustrated herein as being an encoding of the modules, or being within modules, and may be embodied in any suitable form and organized within any suitable type of data structure.

In one embodiment, the system, components and/or modules discussed herein may include one or more of the following: a server or other computing system including a processor for processing digital data, memory coupled to the processor for storing digital data, an input digitizer coupled to the processor for inputting digital data, an application program stored in one or more machine data memories and accessible by the processor for directing processing of digital data by the processor, a display device coupled to the processor and memory for displaying information derived from digital data processed by the processor, and a plurality of databases or data management systems.

In one embodiment, functional block components, screen shots, user interaction descriptions, optional selections, various processing steps, and the like are implemented with the system. It should be appreciated that such descriptions may be realized by any number of hardware and/or software components configured to perform the functions described. Accordingly, to implement such descriptions, various integrated circuit components, e.g., memory elements, processing elements, logic elements, look-up tables, input-output devices, displays and the like may be used, which may carry out a variety of functions under the control of one or more microprocessors or other control devices.

In one embodiment, software elements may be implemented with any programming, scripting language, and/or software development environment, e.g., Fortran, C, C++, C#, COBOL, Apache Tomcat, Spring Roo, Web Logic, Web Sphere, assembler, PERL, Visual Basic, SQL, SQL Stored Procedures, AJAX, extensible markup language (XML), Arduino, Flex, Flash, Java, .Net and the like. Moreover, the various functionality in the embodiments may be implemented with any combination of data structures, objects, processes, routines or other programming elements.

In one embodiment, any number of conventional techniques for data transmission, signaling, data processing, network control, and the like as one skilled in the art will understand may be used. Further, detection or prevention of security issues using various techniques known in the art, e.g., encryption, may be also be used in embodiments of the invention. Additionally, many of the functional units and/or modules. e.g., shown in the figures, may be described as being "in communication" with other functional units and/or modules. Being "in communication" refers to any manner and/or way in which functional units and/or modules, such as, but not limited to, input/output devices, computers, laptop computers, PDAs, mobile devices, smart phones, modules, and other types of hardware and/or software may be in communication with each other. Some non-limiting examples include communicating, sending and/or receiving data via a network, a wireless network, software, instructions, circuitry, phone lines. Internet lines, fiber optic lines, satellite signals, electric signals, electrical and magnetic fields and/or pulses, and/or the like and combinations of the same.

By way of example, communication among the users, subscribers and/or server in accordance with embodiments of the invention may be accomplished through any suitable communication channels, such as, for example, a telephone network, an extranet, an intranet, the Internet, cloud based communication, point of interaction devices (point of sale device, personal digital assistant, cellular phone, kiosk, and the like), online communications, off-line communications, wireless communications, RF communications, cellular communications, Wi-Fi communications, transponder communications, local area network (LAN) communications, wide area network (WAN) communications, networked or linked devices and/or the like. Moreover, although embodiments of the invention may be implemented with TCP/IP communications protocols, other techniques of communication may also be implemented using IEEE protocols, IPX, Appletalk, IP-6, NetBIOS, OSI or any number of existing or future protocols. Specific information related to the protocols, standards, and application software utilized in connection with the Internet is generally known to those skilled in the art and, as such, need not be detailed herein.

In embodiments of the invention, the system provides and/or receives a communication or notification via the communication system to or from an end user. The communication is typically sent over a network, e.g., a communication network. The network may utilize one or more of a plurality of wireless communication standards, protocols or wireless interfaces (including LTE, CDMA, WCDMA, TDMA, UMTS, GSM, GPRS. OFDMA, WiMAX, FLO TV, Mobile DTV, WLAN, and Bluetooth technologies), and may be provided across multiple wireless network service providers. The system may be used with any mobile communication device service (e.g., texting, voice calls, games, videos. Internet access, online books, etc.), SMS, MMS, email, mobile, land phone, tablet, smartphone, television, vibrotactile glove, voice carry over, video phone, pager, relay service, teletypewriter, and/or GPS and combinations of the same.

Reference will now be made in detail to an embodiment of the present invention, an example of which is illustrated in the accompanying drawings.

FIG. 1 illustrates an exemplary flood irrigation system according to an embodiment.

Referring to FIG. 1, the flood irrigation system 100 includes a riser assembly 110, which includes a control system 130 and riser valve actuator system for lifting a riser valve (not shown) that is configured to release the water onto the field. In one embodiment, the riser valve actuator system includes an air spring 111, an gas regulator 112, and a compressed gas vessel 113. Other exemplary embodiments of the riser valve actuator system will be discussed below with respect to FIGS. 7A-7B. The flood irrigation system 100 further includes a sensor assembly 120, which includes a water sensor 121 and sensor electronics 112.

It is noted that certain flood irrigation systems are currently in use utilizing flood irrigation methods for their crop production (e.g., alfalfa and alfalfa seed stock). While present flood irrigation has many positive attributes, it does have some major drawbacks. In some situations watering cycles can last for up to 12 hours on a 20 acre farm. Flood irrigation has high labor costs simply to observe the flow of water as it is being applied to the field. An additional problem experienced is the outright lack of labor. In an embodiment the flood irrigation system 100 may be used as a replacement for these current flood irrigation systems and other system as known now or may be derived later.

The flood irrigation system 100 may include one or more properties/features that are important and/or relevant for the intended use, some of which are listed as follows:

It is very important that the flood irrigation system 100 automatically irrigate the field. This means that the valve controlled by the respective riser assembly 110 needs to be able to turn off the water when water is detected at the end of the field. In a preferred embodiment, the flood irrigation system 100 is deployed and used in an array in conjunction with other flood irrigation systems 100 (or in other arrangements and/or other flood irrigation systems). As such, the flood irrigation system 100 may need to open the next valve of the respective flood irrigation system in the sequence when the water is detected at the end of the field and turned off.

The flood irrigation system 100 may have other features that allow it to do this process in a more economical and safe manner. The category of features represents the items that the final device should be capable of doing and features that should be utilized.

Some of these features are noted as follows:
Robust
Utilize commonly available parts
Universal water fittings
Withstand maximum water pressure
Low cost
Minimize access to moving parts
Lightweight sensor
Portable sensor
Utilize off-grid power
Immune to electromagnetic interference (EMI)
Sensor taller than crop
Sense water depth
Wireless between riser and sensor
Wireless up to around 2600 feet The flood irrigation system 100 may also have additional features that improve various efficiency and condition of usage such as being completely wireless or using renewable energy sources.

These listed properties/features may be separated into qualitative and quantitative categories, and the quantitative requirements may be further converted into engineering requirements and/or specifications for the expect usage conditions of the flood irrigation system 100.

For example, the operational durability is based on the minimum number of cycles required for a particular environment and/or application (e.g., the alfalfa crop in Cedarville Calif.). In this environment/application, watering may be needed for only 7 times a year (e.g., the time when the flood irrigation needs to be activated and used). As such, it is desirable that the flood irrigation system 100 be able to withstand 35 years of operation. An exemplary list of the engineering specifications for such an exemplary application is listed in Table 1 below.

TABLE 1

| Requirement | Engineering Specifications | Metric | Method/Device | Target | Condition |
| --- | --- | --- | --- | --- | --- |
| Operational Durability | Cycle Count | cycles | Open and close valve in operating conditions | 250 cycles | 7 cycles/year |
| Withstand Pressure | Pressure | psi | Pressurize valve | 20 psi | Static pressure head |
| Cost Effective Riser | Cost | US dollars | Total cost of unit | $1000 | Cost of riser only |
| Light Weight Sensor | Weight | lbs | Scale | <50 lbs | Inclusive of all sensor components |
| Sensor Taller Than Crop | Height | in | Tape measure | >36" | >36" installed in field |
| Sense Depth of Water | Height | in | Tape measure | ½" | ½" of water in the field |
| Wireless Communications at Certain Range | Distance | ft | Surveyor's wheel | <800' | Distance between riser and sensor |

TABLE 1-continued

| Requirement | Engineering Specifications | Metric | Method/Device | Target | Condition |
|---|---|---|---|---|---|
| Utilize Off Shelf Components | Quantity | % | Bill of materials | 75% | Percent parts not manufactured |

It is also noted that currently flood irrigation systems rely on the use of physical cables (e.g., buried CAT-5 cable in the field) to allow for the communication between riser units. A flood irrigation system that communicates wirelessly over the range of the field eliminates the need to bury and string wire across the length of the crop. The flood irrigation system 100 may include a radio frequency transceiver and an infrared light transceiver to accomplish this. Based on criteria such as distance of signal travel, cost, interference susceptibility, and interface circuitry of the transceiver, an implementation of a radio-frequency transceiver as a form of communication according to an embodiment is discussed with respect to FIGS. 11-18 below.

To satisfy portability of the flood irrigation system 100, the water sensor 121 (and the respective sensor electronics 122) forming the sensor assembly 120 may be housed on a stake that is driven into the ground at the opposite end of the field from the riser assembly 110. Once in place, the water sensor 121 can be adjusted on the stake to the proper height to allow it to control the riser valve actuator system (e.g., triggering the valves to open and close). Further, this setup allows for indoor storage when the flood irrigation system 100 is not in use.

In an embodiment, the air spring 111 is used to open and close the lid on the riser valve. In order to size the air spring 111, three things should be accounted for, which include the operating pressure, the stroke required, and the force that acts on the air spring 111.

The force may be calculated using Bernoulli's equation (See Equation 1 and 2).

$$\frac{p}{\gamma} + z + \frac{v^2}{2g} = hp + \frac{p}{\gamma} + z + \frac{v^2}{2g} \quad (1)$$

$$f = pa \quad (2)$$

It is noted that the stagnation pressure is a critical part of the calculation of the amount of force required to close the lid. The stagnation pressure occurs when the pump "dead heads" into the valve. As such, assuming equal elevation heads and zero velocity, Equation 1 simplifies to Equation 3.

$$\frac{p}{\gamma} = hp \quad (3)$$

In an exemplary application, the air spring 111 should hold back a pressure head of 15 feet (e.g., based on a rating of the water pump), and have an operating stroke that will allow water to flow freely from the riser (e.g., based on the condition of the available water). For example, with a 12" diameter riser, and the aforementioned pressure head, the air spring 111 needs to be able to hold back 735 lbs based on the estimation.

The next thing that needed to be calculated was the minimum height required to open the valve and have no subsequent pressure drop. In order to do this the use of continuity was required. The use of continuity requires a known flow rate and diameter. Minimum height can be calculated by Equation 4. We also require continuity for the design purposes of no velocity rise (Equation 5).

$$A_1 v_1 = A_2 v_2 \quad (4)$$

$$A_1 = A_2 \quad (5)$$

In the exemplary application, for a given flow rate of 6.4 CFS, and for a 12 inch diameter pipe, or an area of 113.1 inches, this gives a height opening of 3 inches (from a cylindrical surface area). Therefore, the minimum required height for no velocity rise is 3 inches. A factor of safety of 1.66 may be applied yielding a minimum design height of 5 inches.

Suitable manufactured air spring may be selected based on these estimations (e.g., The Double-Tire Style Adjustable Air Spring (9551K54) by McMaster Carr, which can perform within tolerance for a height of 5 inches and a load of 735 lbs at or below 20 psi).

The compressed gas vessel 113 should also be matched to supply the air spring 111 with enough pressurized gas to open and close the riser at the frequency needed (e.g., seven times). Using the ideal gas law (Equation 6), where the mass gas constant and temperature are approximately constant from the high pressure tank (e.g., compressed gas tank 113) to the flow pressure spring (e.g., air spring 111), let state 1 be the tank and state 2 be the spring (Equation 7).

$$PV = ZnRT \quad (6)$$

$$\frac{P_1 V_1}{Z} = P_2 V_2 \quad (7)$$

It is noted that since n, R, and T from the ideal gas law are shared by both the compressed gas vessel 113, and air spring 111, the compressed gas tank can be sized to the frequency needed (e.g., seven).

In the exemplary application, we may select an air spring 111 with a height of 10.1" and a diameter of 6". As such, the volume of the air spring 111 is 502.64 inch$^3$. A selected compressed gas vessel 113 may have a pressure of 3000 psi, thus leading to a cycle volume ($V_1$) of 3.92 inch$^3$ (using Equation 7). A compressed gas vessel 113 volume of 47 inch$^3$ would yield a cycle rate of 11.98 cycles (using Equation 8), achieving the seven cycles needed plus a tolerance.

$$N_{cycle} = \frac{Volume_{tank}}{Volume_{cycle}} \quad (8)$$

FIGS. 2A-2D illustrate exemplary flow configurations for a riser assembly of a flood irrigation system according to an embodiment.

In an embodiment, compressed gas vessel 113 contains a gas for inflating or deflating the air spring 111 (through the gas regulator 112). For the purpose of understanding, gas refers to a substance that is not substantially solid or liquid. In a preferred embodiment, the gas would be pressurized. In an embodiment, the gas may be one or more of propane, air, Nitrogen, stream, or other gases.

To control the flow of gas between the compressed gas vessel 113 and the air spring 111, a gas regulation system is needed (e.g., gas regulator 112). In an embodiment, a 3-Way Normally Open (3WNO) magnetic latching solenoid valve may be used. Unlike regular 3WNO's, a magnetic latching valve only requires a pulse of current, rather than a steady supply voltage, lending itself to low-power applications.

Figure 2A:
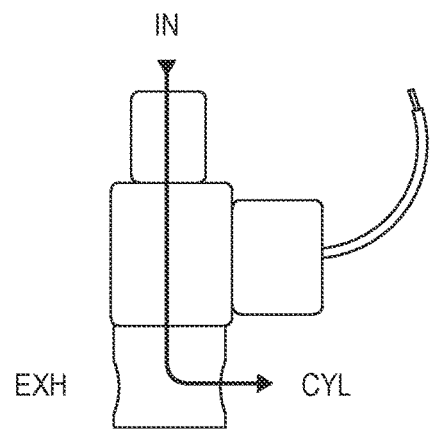
FIGS. 2A-2D illustrate exemplary flow configurations for a riser assembly of a flood irrigation system according to an embodiment.
Figure 2B:
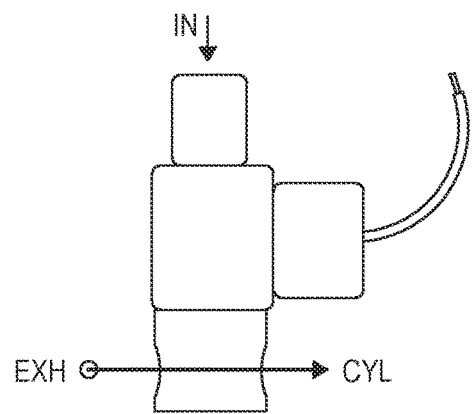
Figure 2C:
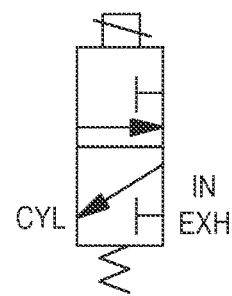

With reference to FIG. 2A, when the solenoid is de-energized, a supply of pressurized gas keeps the air spring 111 inflated and the riser valve closed. With reference to FIG. 2B, when energized, the solenoid blocks the input port, and opens the exhaust port. As a result, the pressure of the water line deflates the air spring 111, and the water begins to flow from the resulting clearance. The solenoid's state can be switched from open to closed state and can be switched from open to closed current in the appropriate direction.

Figure 2D:
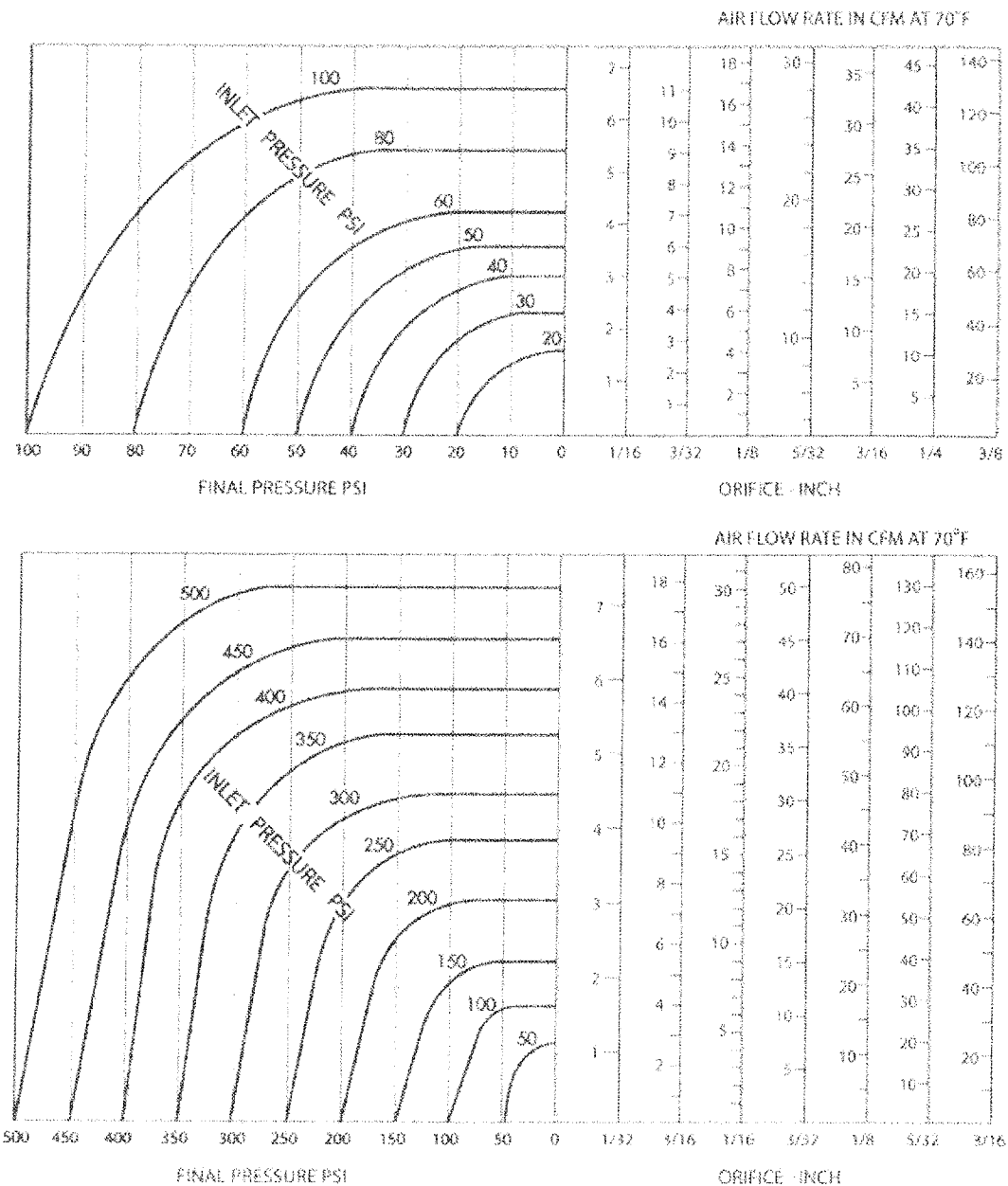

Referring to FIG. 2D, gas flow charts are shown with respective to an inlet pressure (e.g., as provided by the compressed gas vessel 113 through the gas regulator 112). As such, an orifice size may be chosen to give appropriate pressure to the air spring 111. A line regulator may precede this solenoid so proper pressure is obtained at the inlet of the solenoid (e.g., 22 psi for an exemplary application).

FIGS. 3A-3F illustrate exemplary structural analyses of a riser assembly of a flood irrigation system according to an embodiment.

It is noted that a support structure for the riser assembly 110 is needed to withstand the previously mentioned forces.

Further, under certain circumstances, there is a situation that will create a water hammer effect, whereby there is a pressure surge caused as the water in motion from the riser is forced to stop suddenly. For example, if the lid was to close suddenly (e.g., in less than 1.5 seconds), with no other relief source open, the water hammer force can occur. The water hammer force may be estimated using Equations 9 and 10.

$$\Delta P = \rho C \Delta V \quad (9)$$

$$c = \sqrt{\frac{K \text{mod}}{\rho}} \quad (10)$$

The modified bulk modulus ($K_{mod}$) is now used to find the speed of sound in water using Equation 11, where $\rho$ is the density of water.

$$K_{mod} = \frac{K}{\frac{(1+(D*K))*C}{e*E}} \quad (11)$$

The change in pressure is then calculated and the maximum water hammer force can be calculated using Equation 12.

$$F = \Delta P * A \quad (12)$$

In the exemplary application, the maximum force developed by this water hammer is around 4000 lbs.

Figure 3A:
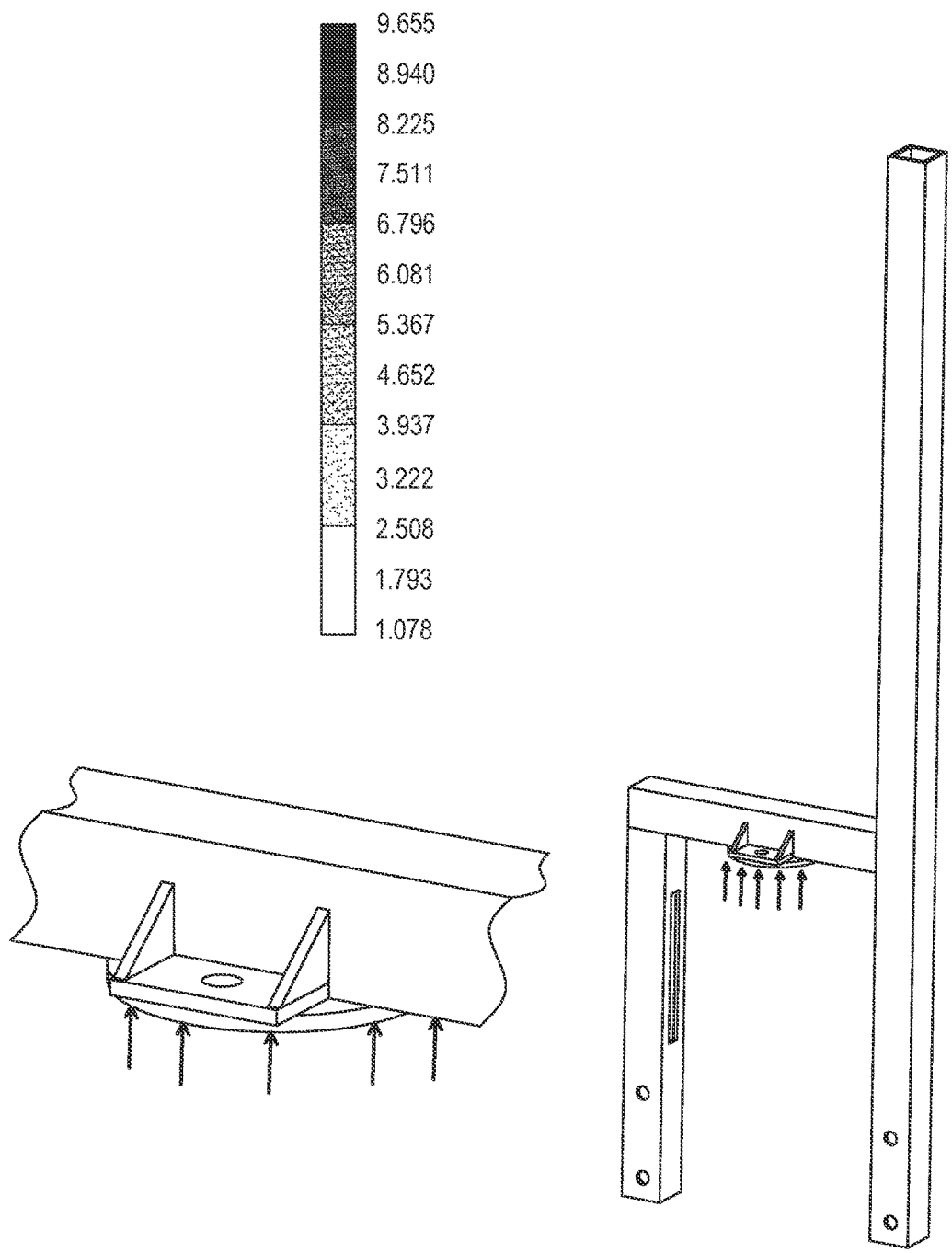
Figure 3B:
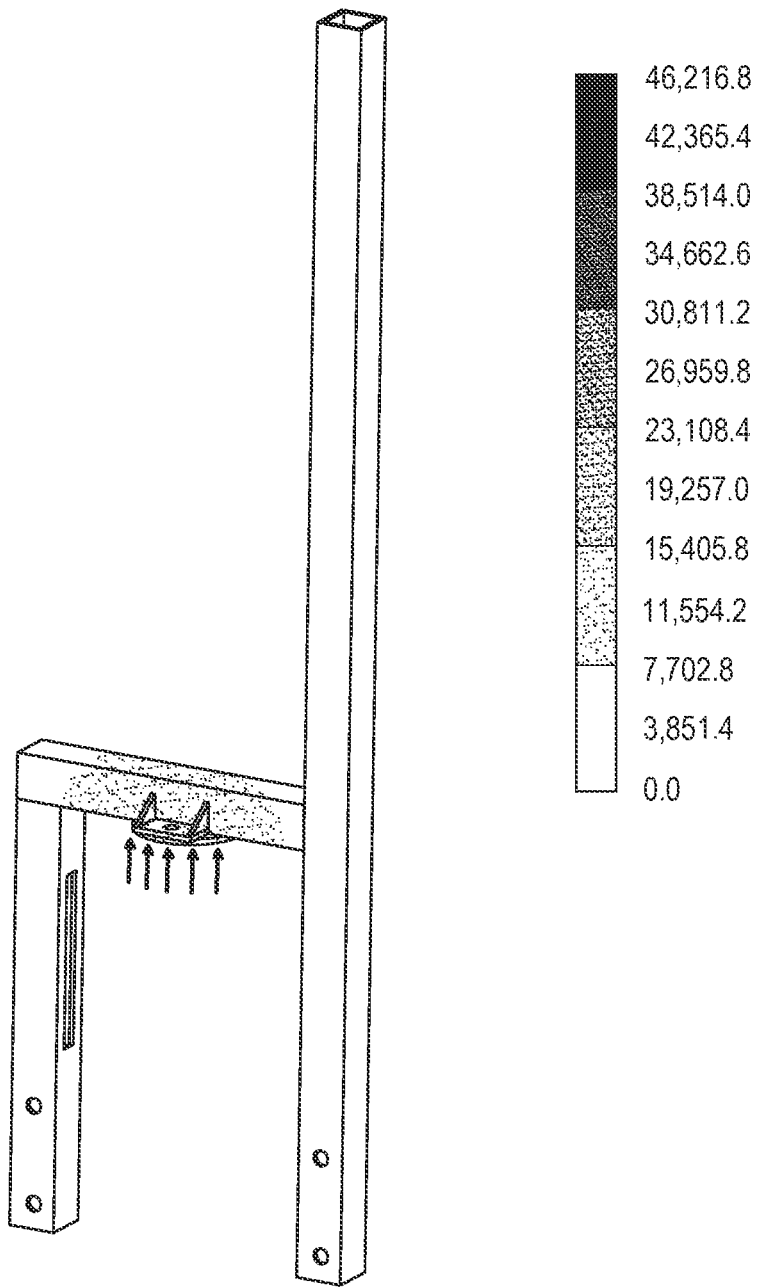
Figure 3C:
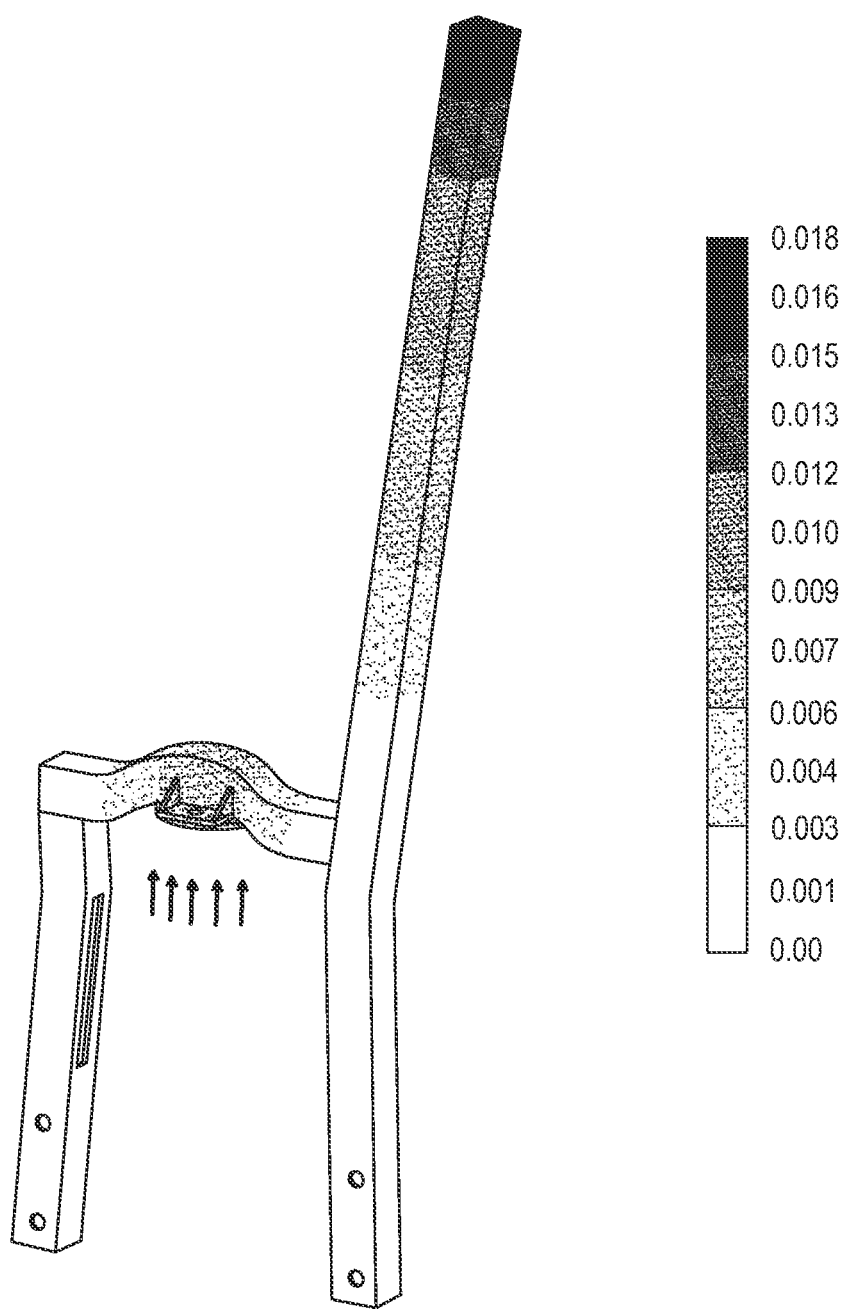
Figure 3D:
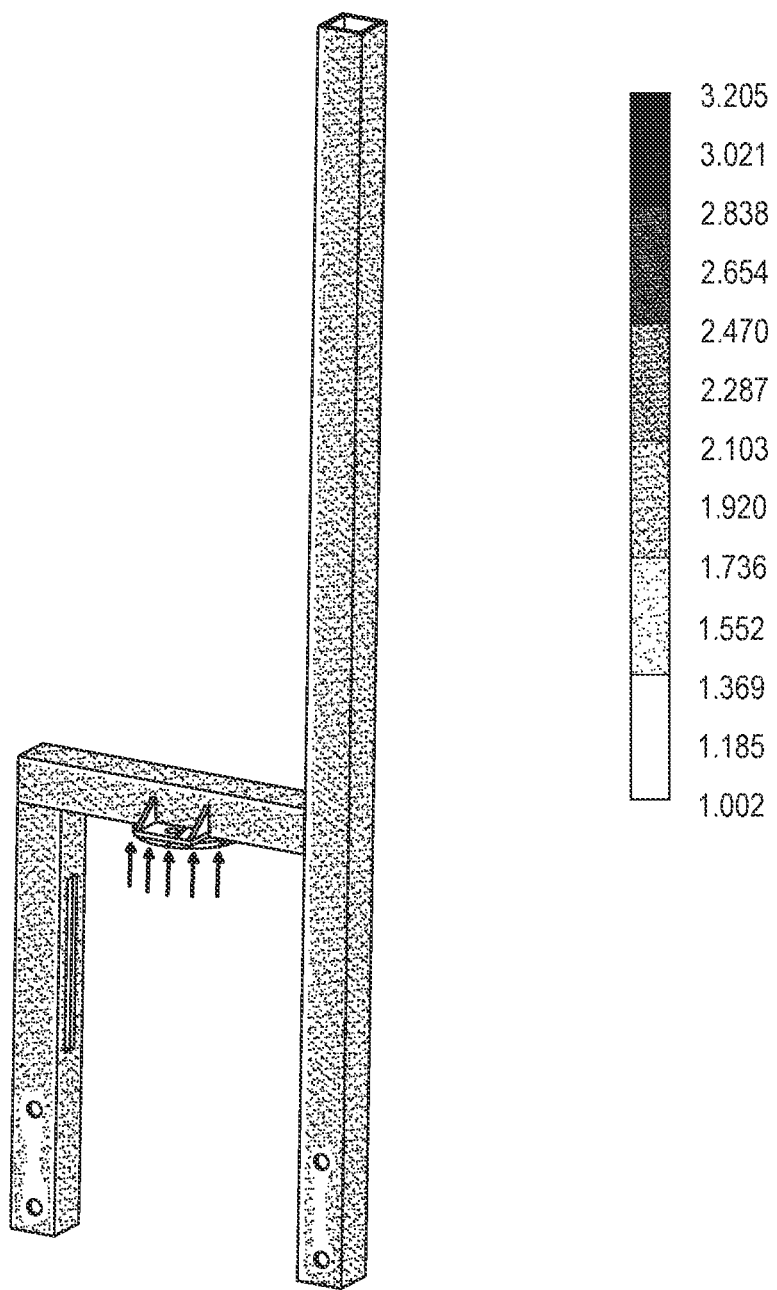

For the exemplary application, structural analyzes were performed using refined mesh for tube steel. A 4000 lbs load is applied at the location supporting the air spring 111 (as indicated by the arrows). FIG. 3A shows the support structure using a refined mesh of a high aspect ratio. FIG. 3B shows the corresponding Von Misses stress of the support structure for a 4000 lbs load. FIG. 3C shows the corresponding displacement for a 4000 lbs load. Structural analyzes were further performed using shell element for tube steel, as using tube elements may be better for examining thin-walled members. FIG. 3D shows the support structure using a shell element aspect ratio. FIG. 3E shows the corresponding minimum factor of safety (FOS) for a 4000 lbs load. FIG. 3F shows the corresponding FOS for a 4000 lbs load.

Referring to FIG. 3C, it is noted that the displacement of where the force is applied is relatively low and is deemed not an issue. Referring to FIGS. 3E and 3F, the lowest factor of safety is 1.1. This takes place in a sharp corner, and around the lowest point, the factor of safety is higher. It is further noted that, in practice, that edge will not be sharp since there will be a fillet weld reducing the stress in that corner.

Further, it is again noted that 4000 lbs represents the maximum load for the support structure (e.g., from the water hammer force). It is expected that the force will achieve such a high level under normal operating conditions.

Therefore, the support structure for the riser assembly 110 would hold under high pressure conditions.

Figure 4:
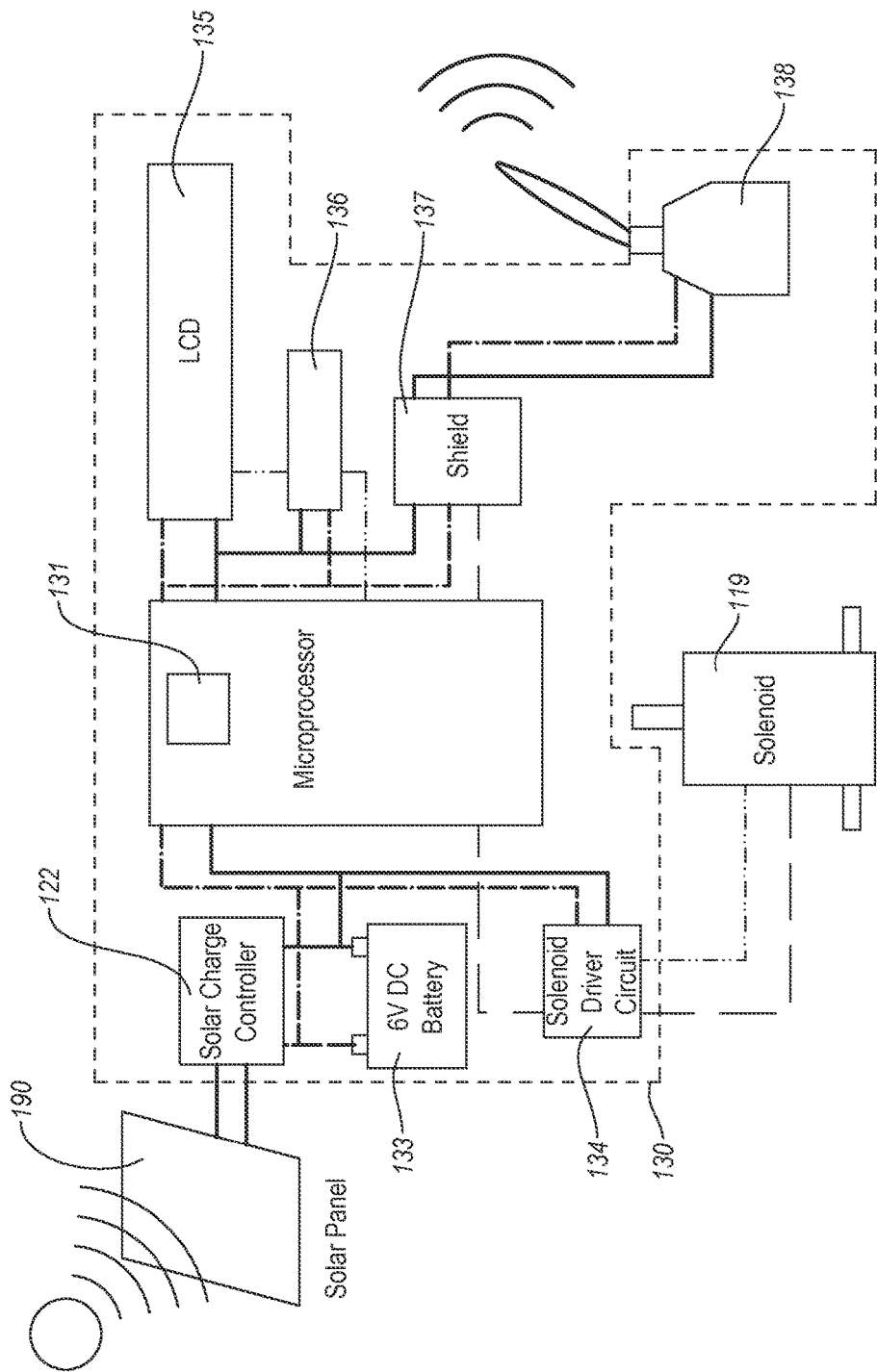
FIG. 4 illustrates an exemplary block diagram of a riser assembly of a flood irrigation system according to an embodiment.

FIG. 4 illustrates an exemplary block diagram of a riser assembly of a flood irrigation system according to an embodiment.

The control system 130 may include one or more a processor 131 (e.g., STM 32F4 microprocessor), which is coupled to electronics such as LCD 135 (e.g., CrystalFontz LCD or other display unit), signal converter 136 (e.g., serial to TTL), wireless antenna 138 (e.g., XBce Pro Series 1 antenna or other wireless antenna), wireless shield 137, solenoid driver circuit 134 (or other riser valve control) for driving 3WNO solenoid 119 that fitted with the gas regulator 112 as discussed above (or other riser valve control), solar charge controller 132 (or other power controller) for receiving power from solar panel 190 (or other power source), and battery 133 for storing the receiving power.

It is noted that components described in FIG. 4 may be replaced or modified using other components as known now or may be later derived by one of ordinary skill in the art. For example, the XBee shield 137 and XBee antenna 138 may be replaced by another wireless system. In another example, the LCD 135 and the signal converter 136 may be replaced by another display system. The solenoid driver circuit 134 may be replaced to work with another valve control system on the riser assembly 110. The solar charge controller 132 may be replaced by another power controller for another power source. Other components may be added (e.g., inputs interface such as keypad, touch interface on the display (e.g., display 135)). The processor 131 may be replaced by a suitable processor for accommodating the replaced components. Additional modifications and additions to the electronics components are further described with respect to FIGS. 11-18 below.

In another embodiment, a design for the control system houses all the electrical components in the control box 130. The processor 131 may be a Freakduino microcontroller, an offshoot of the Arduino, that acts as the main controller of the system due to its ease of use and incorporated wireless communication capabilities. The processor 131 switches the state of the solenoid (in gas regulator 112) with a SN7544 h-bridge motor driver IC (as the solenoid driver circuit 134). The user is provided with a 16×2 LCD display (as the LCD 135) and three buttons, along with a main power switch.

With this interface, the user is allowed to choose between four different modes of operation (three automatic, and one manual). The system may further include a buzzer for safety purposes. For example, in modes where the valve has been open for extended periods of time, before it closes, a loud tone is played alerting the user to stay clear of the moving parts. The whole system runs off battery power 133 and may be recharged with a solar panel 190. The flow of current into and out of the battery is controlled via a charge controller 132.

With respect to the power system and supply, a photovoltaic system enables off-the-grid operation. This system includes a solar array 190, a charge controller 132, and a battery 133. The battery 133 should be able to maintain its charge through multiple days of autonomy, and still supply the riser assembly 110 with power. The subsequent method and guidelines for sizing a battery may be used to provide a reliable storage system for such a stand-alone alternative energy solution, as follows:

Calculate the load in Watt-hours per 24-Hr Day (Wh/d) as accurately as possible.

Include the appropriate factors: Temperature, autonomy, design margin, and depth of discharge (DOD).

Consider shallow daily DOD (max 20% recommended) and occasional deeper DOD (max 80%) during cloudy days.

Use the correct battery rating (100-Hr), or a battery rating that approximates the actual autonomy hours for the system load.

Days of Autonomy:

The sun does not shine with equal intensity every day, at night and during inclement weather. Cloud cover, rain, snow, and etc., diminish the daily insolation. Insolation is the amount of solar energy delivered to the earth's surface; it is measured in Watts/meter. A storage factor should be employed to allow the photovoltaic battery system to operate reliably throughout these periods. This storage factor is commonly referred to as "Number of Days of Battery Autonomy". The number of days is established by evaluating the peak hours of sun per day [(kW/m2)/day] for the lowest insolation month of the year, with the solar array oriented for maximum output during that month. The minimum number of days that should be considered is 5 days of storage for even the sunniest locations on earth. In these high sun locations there will be days when the sun is obscured and the desired battery's average daily depth of discharge is limited to 20%. Therefore, the recommended days of autonomy storage are listed in Table 2.

TABLE 2

| kW/m²/day | Days of Storage |
|---|---|
| 4.5+ | 5 |
| 3.5-4.5 | 6 |
| 2.7-3.5 | 7 |
| 2.0-2.7 | 8 |

Operating Temperature:

The temperature of the battery can be a major factor in sizing the system. Lead acid battery capacity is reduced in cold temperatures. Lead acid battery life is shortened in high temperatures. It should be noted that the temperature of the battery itself and ambient temperature could be vastly different. While ambient temperatures can change very quickly, battery temperature changes much slower. This is due the mass of the battery. It takes time for the battery to absorb temperature and it takes time for the battery to relinquish temperature, therefore, the battery's temperature is normally the average temperature for the past 24 hours plus or minus a few degrees. Table 3 provides temperature correction factors for different types of batteries.

TABLE 3

| (° F.) | (° C.) | Flooded (FLA) | AGM | GEL |
|---|---|---|---|---|
| 77 | 25 | 1.00 | 1.00 | 1.00 |
| 50 | 10 | 1.19 | 1.08 | 1.11 |
| 32 | 0 | 1.39 | 1.20 | 1.25 |
| 13 | −10 | 1.70 | 1.35 | 1.42 |

Depth of Discharge (DOD):

Many battery manufacturers will advise sizing the battery for cyclic applications to a maximum depth of discharge of 50%. That would mean doubling the size of the battery. Some batteries have trouble recovering from deep discharges. That would mean for the 60 AH/Day load with 5 days of autonomy, or 300 AH, that they would advise using a 600 AH battery. The recommended DOD is 0.2; typical is 0.5.

In the exemplary application, sizing a battery begins with calculating the energy that will be consumed on a daily basis (e.g., Table 4 on energy consumption for exemplary parts). As can be seen in Table 4, some system components have two different modes, each with its own energy needs.

TABLE 4

| Load Description | Watts (W) | DC Load Voltage (V) | Duration (Hrs) | Energy Consumption (Wh/d) |
|---|---|---|---|---|
| Solenoid | 10 | 6 | 0.001 | 0.01 |
| Microprocessor (Active Mode) | 1.5 | 5 | 0.083 | 0.125 |
| Microprocessor (Sleep Mode) | 0.1 | 5 | 12 | 1.2 |
| XBee (Active Mode) | 0.975 | 3.3 | 0.083 | 0.081 |
| XBee (Sleep Mode) | 0.165 | 3.3 | 12 | 1.98 |
| LCD | 1.75 | 5 | 0.083 | 0.146 |
| Total Energy Consumption: | | | | 3.542 Wh/day |

Based upon the operation parameters, the adjusted battery bank capacity can now be determined using Equation 13 (e.g., 7.14 Amp-Hours for the exemplary application or a 6V, 12 Amp-Hours battery for battery 133).

$$Ah_a = \frac{Ah_a * TC * DA * DM}{DOD} \quad (13)$$

Figure 5:
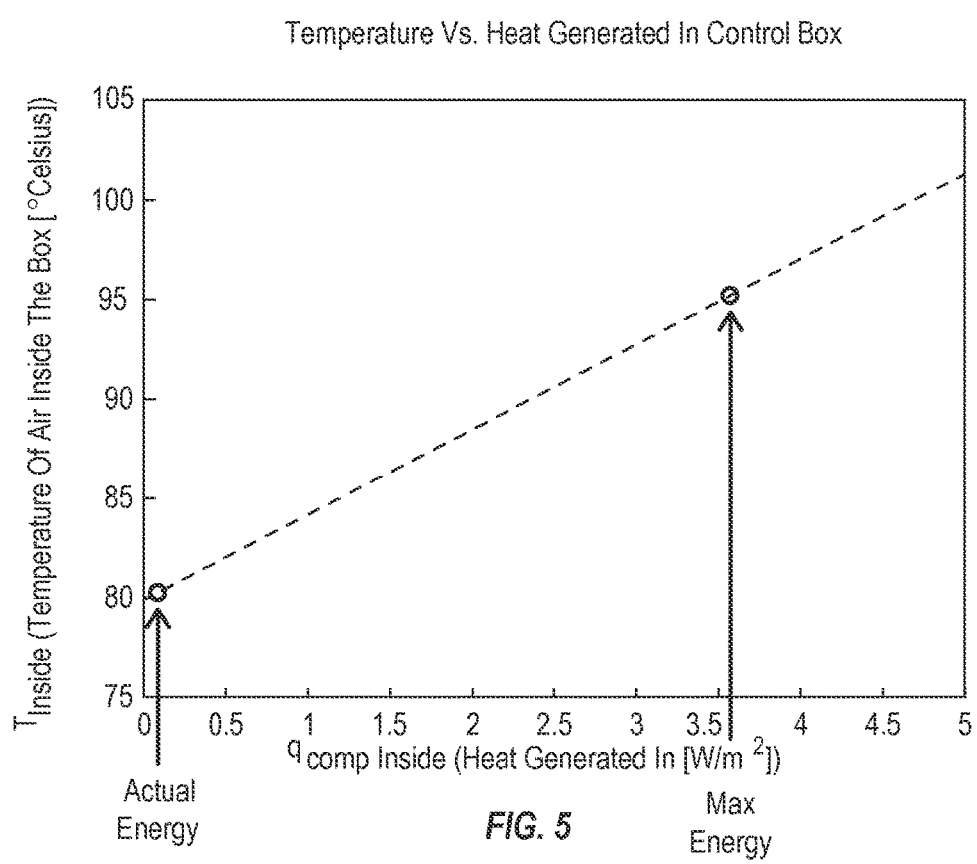
FIG. 5 illustrates an exemplary graph showing temperature vs. heat generated under operating conditions for a riser assembly of a flood irrigation system according to an embodiment.
Figure 6:
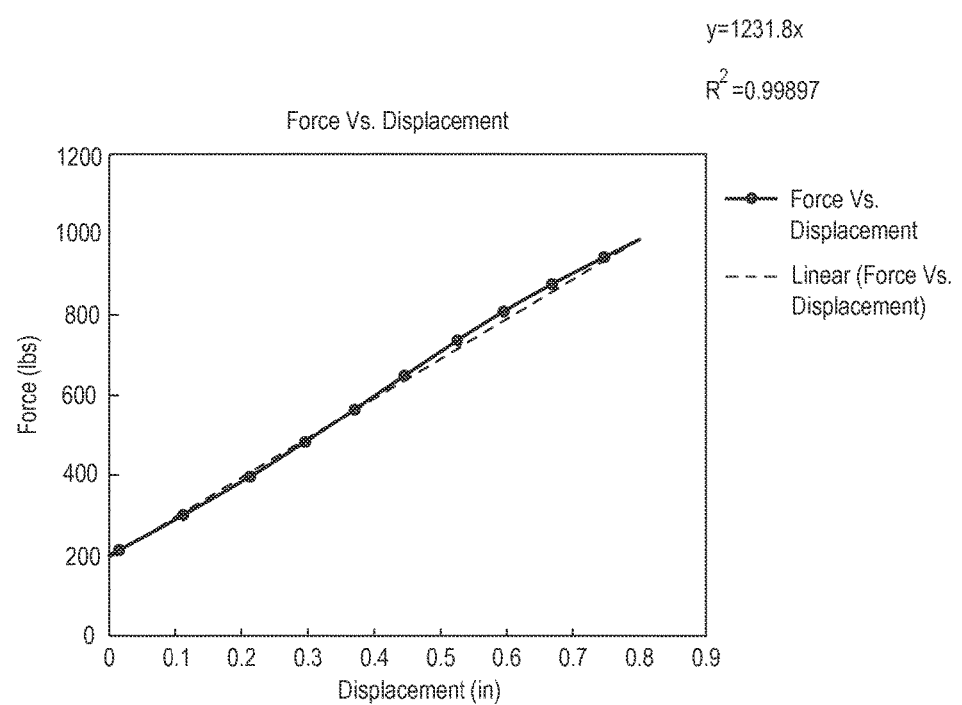
FIG. 6 illustrates an exemplary graph showing force vs. displacement under a pressure test for a riser assembly of a flood irrigation system according to an embodiment.

FIG. 5 illustrates an exemplary graph showing temperature vs. heat generated under operating conditions for a riser assembly of a flood irrigation system according to an embodiment.

It is noted that the operating temperatures of the electronics (as shown in FIG. 4) may be of a particular concern. Since the control system will be housing the electronics (e.g., in control box 130), it is important to know the temperature inside the electronics box for reliable operation. For example, the operating range for the electronics may range from −40° C. to 85° C. Such temperature may be accounted for by knowing the heat generated by the electronics, material properties, and ambient conditions, a thermal circuit is utilized, as given by Equation 14.

$$T_{inside}=((q_{comp}+\alpha G_{sum}A_{box})(R_{conv,out})+T_{inf}+q_{comp}(R_{Conv,in}+R_{cond}))-273.15 \quad (14)$$

Referring to FIG. 5, the graph shows the variation of temperature versus heat generated by varying the estimated energy of the electronics. With respect to the exemplary application, the results show that the electronics will be within their operating range, with a max temperature of about 80° C. at maximum operating conditions. The maximum allowable energy consumption of the electronics was determined, in order to stay within the operating range.

EXAMPLES

Without intending to limit the scope of the invention, the following examples illustrate how various embodiments of the invention may be implemented in various applications.

There is interest in developing and implementing irrigation methods that contribute to sustainable farming practices, especially in the areas of producing alfalfa, alfalfa seed, and cereal grains using flood irrigation.

Currently, the flood irrigation industry pays individuals to manually flood fields; this method can take up to 12 hours of paid labor. An automated flood irrigation system is design to eliminate labor and maximize efficiency.

Figure 8:
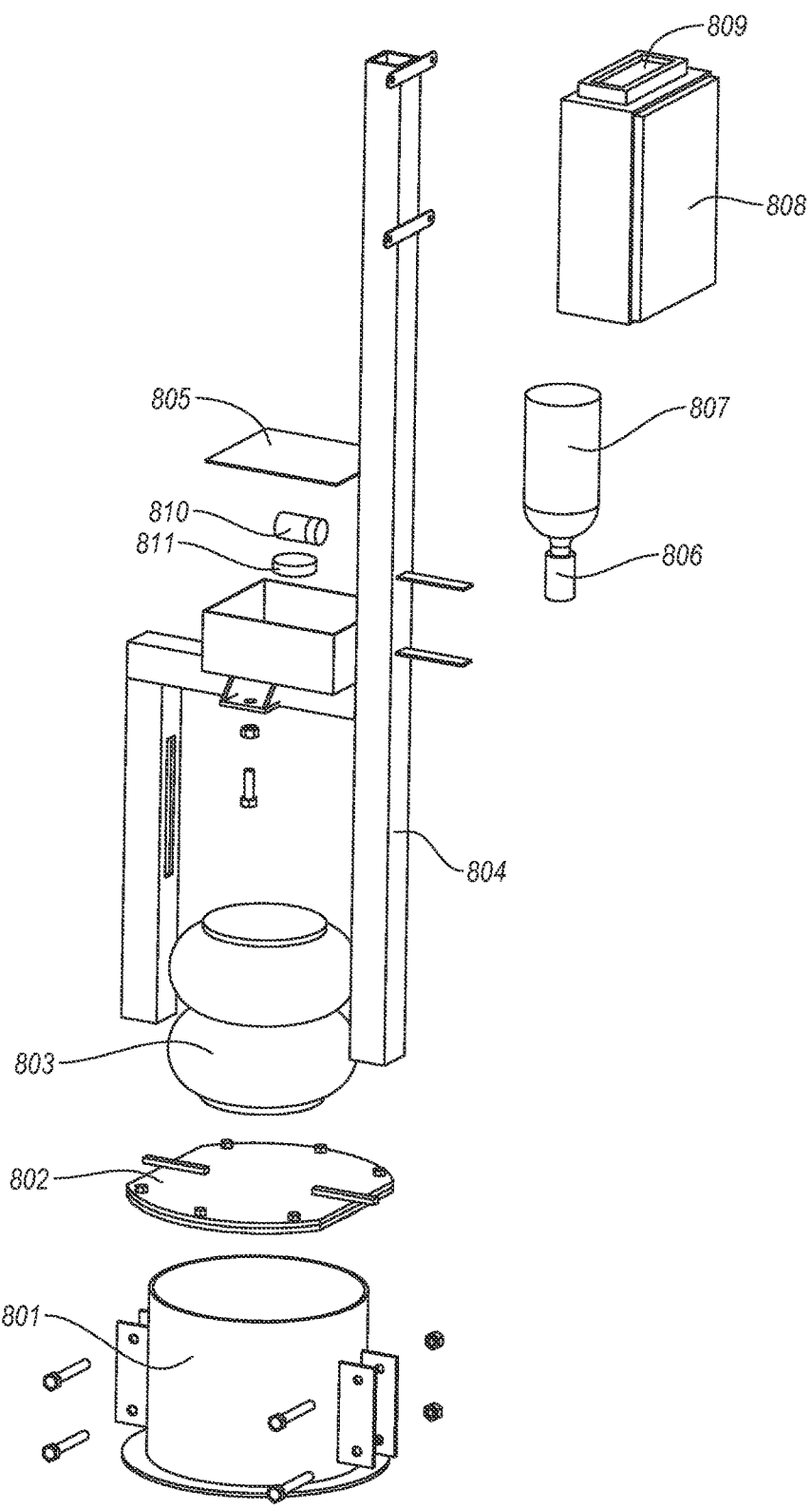
FIG. 8 illustrates an exemplary exploded view of a riser assembly of a flood irrigation system according to an embodiment.

FIG. 8 illustrates an exemplary exploded view of a riser assembly of a flood irrigation system according to an embodiment.

Referring to FIG. 8, the riser assembly includes a lower riser alfalfa valve adaptor 801, a lid assembly 802, an air spring 803 (e.g., by McMaser-Carr), a support structure 804, a gas control box 805 (e.g., by Digi Key), a gas adaptor 806, a compressed gas tank 807 (e.g., by Ans Gear.com), a control system box 808 (e.g., by McMaser-Carr), a solar panel 809 (e.g., by Amazon), a solenoid 810 (e.g., by Peter Paul), and a gas regulator 811 (e.g., by McMaser-Carr).

It is noted that the riser assembly shown in FIG. 8 is one configuration of the riser assembly 110 as shown in FIG. 1 (e.g., the air spring 803 being a configuration of the air spring 111, the compressed gas tank 807 being a configuration of the compressed gas 113, and the gas regulator 811 being a configuration of the gas regulator 112). It is also noted that the control system box 808 (e.g., control box 130) may house the electronics as shown in FIG. 4 (e.g., controlling the solenoid 810 as a configuration of the solenoid 119). The riser assembly hardware and mechanism is designed using a compressed gas vessel, solenoid valve, and pressure regulator to control the flow of gas going into the air spring. The control system contains a user interface that can control the manual and automatic operations of the system.

A main goal of the system's mechanism is to close and open the riser valve in a completely autonomous manner. It is noted that the lower riser alfalfa valve adaptor 801 may be fitted to an existing riser valve (e.g., a Waterman valve), which may also include an existing lid assembly 802.

Figures 9A, 9B:
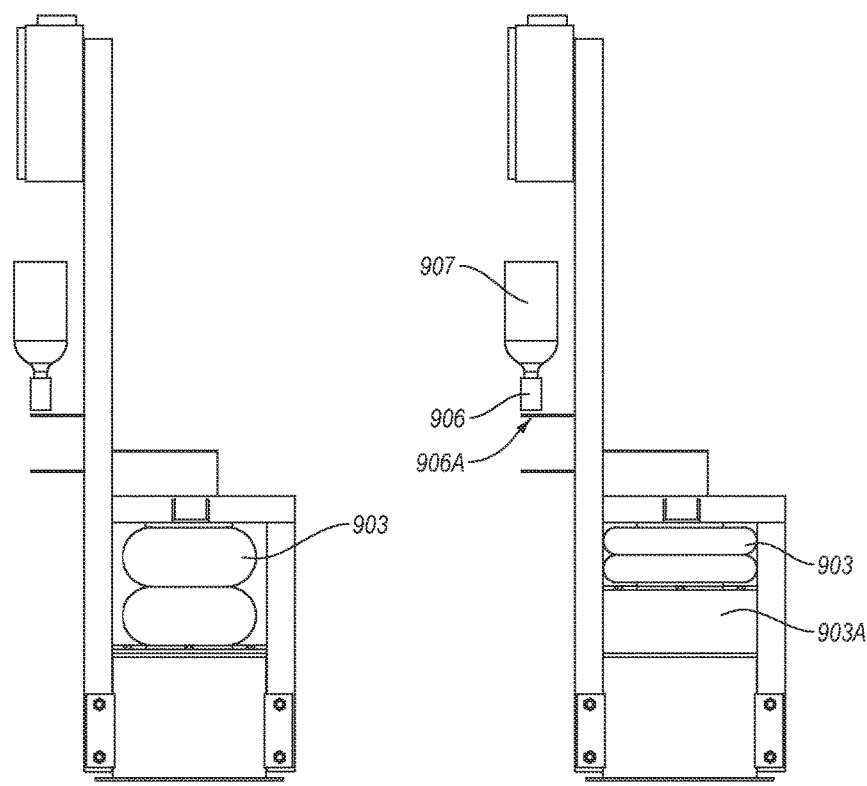
FIGS. 9A-9B illustrate exemplary views of a riser assembly of a flood irrigation system under operation according to an embodiment.

FIGS. 9A-9B illustrate exemplary views of a riser assembly of a flood irrigation system under operation according to an embodiment.

Referring to FIG. 9A, FIG. 9A shows the riser assembly when the riser valve is in a closed position. Here, the lid assembly 802, which is attached to the air spring 803, covers the riser valve (fitted to the lower riser alfalfa valve adaptor) when the air spring 803 is in the extended position. The air spring 803 is attached to the support structure 804 at the connection point (as discussed in the structural analyzes in FIGS. 3A-3F). In the extended position the air spring 803 may be around 7-9 inches in length (as compared with around 66.85 inches for the support structure 804.

Referring to FIG. 9B. FIG. 9B shows the riser assembly when the riser valve is in an open position. Here, the compressed gas tank 807 supplies gas pressure through the gas adaptor 806 (as controlled by the electronics in the control system box 808) to compress the air spring 803. This action lifts the lid assembly 802, which is attached to the air spring 803, which leaves an opening 803A for water to be release from the riser valve attached to the lower riser alfalfa valve adaptor 801. In an exemplary system, the opening 803A may be around 3 inches.

In a further embodiment, with the use of a wireless microcontroller, the flood irrigation system is designed to communicate wirelessly. The water sensor (e.g., water sensor 121A) across a field will sense the presence of water triggering sensor electronics (e.g., sensor electronics 122) to communicate to the riser valve (of the riser assembly) to close and initiate the flooding of the next strip in sequence. That is, once a strip has been flooded, the sensor electronics communicate to the riser valve to close, and open the next riser valve until the field is completely flooded. This is discussed in further detail below with respect to FIG. 12.

Figure 7A:
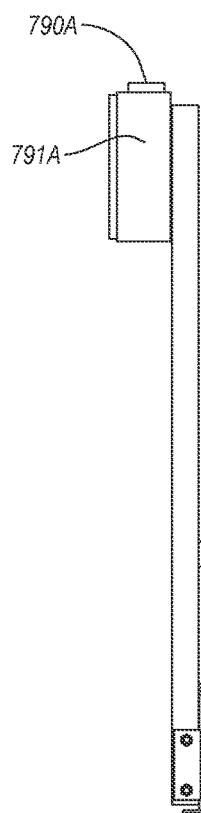
FIGS. 7A-7B illustrate alternate riser valve designs for a riser assembly of a flood irrigation system according to an embodiment.
Figure 7B:
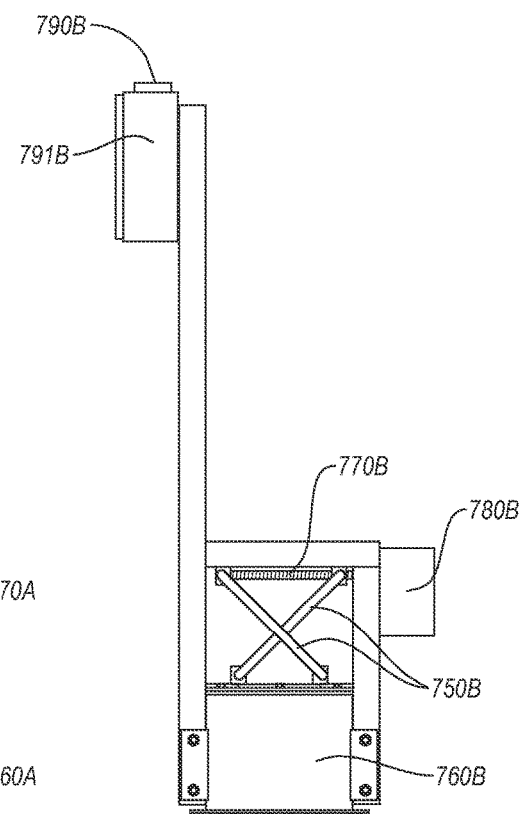

FIGS. 7A-7B illustrate alternate riser valve designs for a riser assembly of a flood irrigation system according to an embodiment.

It is noted that both FIGS. 7A and 7B illustrate alternate riser valve designs using an electrical option as opposed to the compressed gas tank and solenoid for driving the air spring as illustrated in FIG. 9. These consist of an electric motor (e.g., 780A and 780B) driving a lead screw (e.g., 770A and 770B) to actuate the lid, where the lid corresponds to the lid assembly 802 for creating the opening 903A (e.g., 760A and 760B) when the lid is opened.

The lead screw 770A shown in FIG. 7A illustrates a motor driven screw design where the electric motor 780A actuates the screw (e.g., turning the screw in a clockwise or counterclockwise direction) to lift or lower (open or close) the lid that is connected to the leader screw 770A.

The lead screw 770B shown in FIG. 7B illustrates a scissor jack design. Here, the scissor jack 750B may include two crisscrossing rods, where the ends of each of the rods is connected to an opposite side of the lid and the lead screw 770B (and the rods are connected at the midpoint forming the scissor jack). When the electric motor 780A actuates the screw (e.g., turning the screw in a clockwise or counterclockwise direction), the ends of the rods may move closer together or further apart (depending on the direction of the turning of the screw), thereby lengthening or shortening the length of the scissor jack 750B. As such, the lid may be lifted or lowered, creating the opening 760B.

In an embodiment, each of the alternate electrical options may be powered by the solar panel (e.g., 790A and 790B) and controlled by the control box (e.g., 791A and 791B).

Figures 10A, 10B:
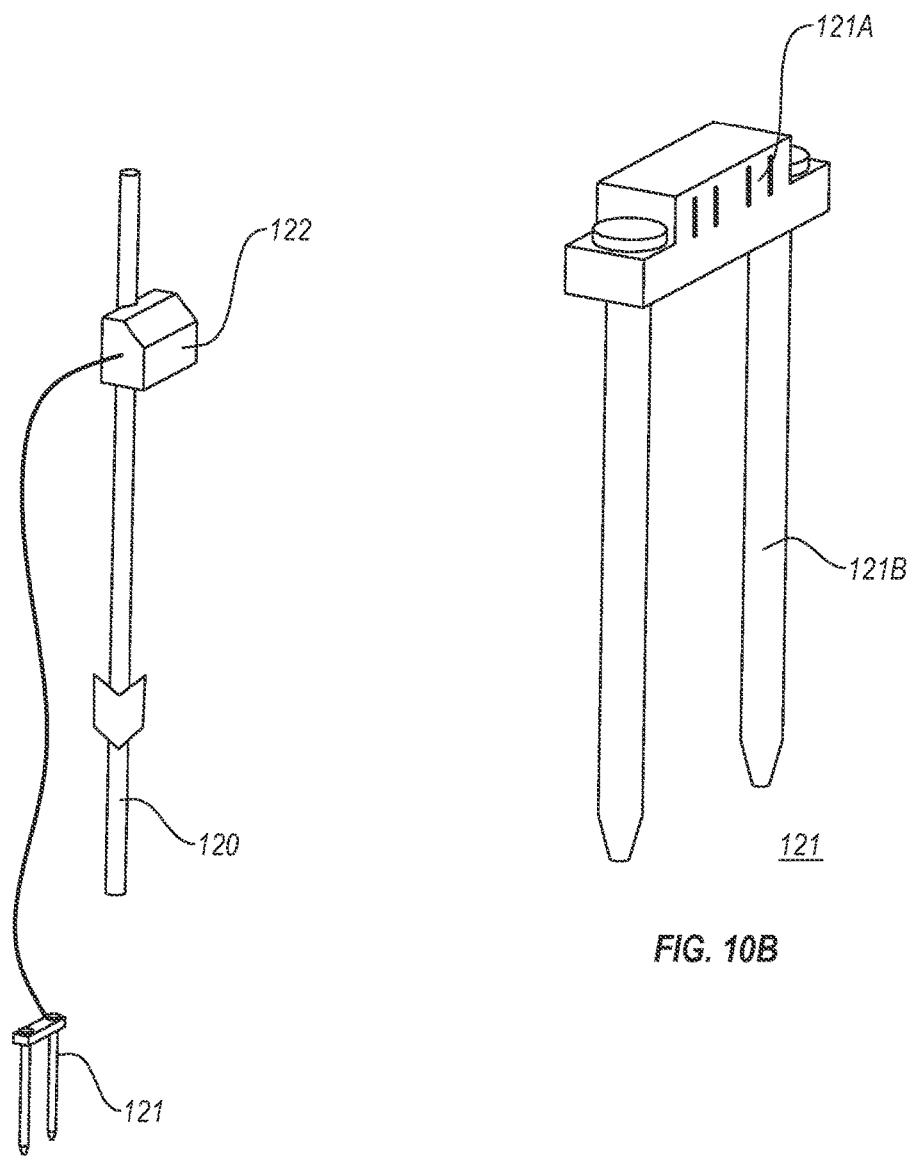
FIGS. 10A-10B illustrate exemplary views of a sensor assembly of a flood irrigation system according to an embodiment.

FIGS. 10A-10B illustrate exemplary views of a sensor assembly of a flood irrigation system according to an embodiment.

Referring to FIG. 10A, the sensor assembly 120 includes a sensor portion 121 and a electronics portion 122 including various electronics. The sensor portion 121 is configured to be installed at a ground level where water is expected (e.g., where flooding by water released by the corresponding riser assembly is expected) and includes a water sensor 121A (for sensing the water) and a mounting 121B (for mounting the sensor portion 121 to the ground). The water sensor 121A may be connected to the electronics portion 122 by wires or by wirelessly.

In an embodiment, the water sensor 121A may be a basic single pole, single throw (SPST) switch. When the flood water reaches the water sensor 121A, it bridges the gap between the two leads, thereby closing the switch. In an embodiment, the water sensor 121A may be installed at a pre-determined height such that the water sensor 121A is configured to only sense when the flood water reaches the pre-determined height.

When the water sensor 121A senses the water, a signal may be sent to the electronics portion 122 (e.g., a microcontroller in the electronics portion 122 reads a voltage on the sensor pin). Subsequently, the electronics portion may start sending a signal (through a wireless antenna or other means) to the control box (e.g., control box 130) of the riser assembly 110 on the other side of the field, alerting it to close the riser valve.

It is noted that, in initial testing of exemplary flood irrigation systems, it was determined that the range of the wireless devices may be directly related to the height of the antennas. If one main relay point was used, this antenna could be permanently mounted at the ideal elevation, allowing all communications to flow through this node. As such, a wireless relay point could be used to increase the range and reducing the needed height of the various antennas in each of the riser assembly and/or the sensor assembly according to an embodiment.

In another embodiment, the lid (e.g., lid assembly 802) may be another point of possible redesign. The current lid, while working, requires machining slots into the vertical sections. The new lid redesign would give the same positioning benefits but without any need for a vertical mill.

In yet another embodiment, given that the system in the exemplary application only operates 7 cycles a year, one recommendation is that instead of using a compressed gas tank, one could use an onboard gas compressor. This concept would let the system operate autonomously for an indefinite length of time with no annual maintenance. One consideration of this change is that the system may need to be converted from the current 6 volt system to a 12 volt (or a higher voltage) system that uses a larger battery and more solar cells.

Example Methods

Without intending to limit the scope of the invention, the following examples illustrate how various embodiments of the invention may be used and/or tested in various applications.

Experiments and/or tests of one or more flood irrigation systems was carried out to determine that the flood irrigation system meets certain qualitative requirements and engineering specifications in certain operating conditions (as outlined in Table 5.

TABLE 5

| Requirement | Engineering Specifications | Metric | Method/Device | Target | Condition |
|---|---|---|---|---|---|
| Operational durability | Cycle count | cycles | Open and close valve in operating conditions | 250 cycles | 7 cycles/year |
| Withstand pressure | Pressure | psi | Pressurize valve | 20 psi | Static pressure head |
| Light weight sensor | Weight | lbs | Scale | <50 lbs | Inclusive of all sensor components |
| Sense depth of water | Height | In | Tape measure | ½" | ½" of water in the field |
| Wireless communications at certain range | Distance | ft | Surveyor's wheel | <800' | Distance between riser and sensor |

A list of experiments was devised and carried out in order to determine the meeting of the specification, as follows:

Cycle Test
  The valve must cycle 210 times.
Water Sensing Unit Test
  Verify water sensing depth.
  Confirm wireless communication range.
Riser Pressure Test
  Verify that riser withstand a pressure of 20 psi.
Test 1—Cycle Test:

The objective is to ensure the riser valve can survive 210 cycles of operation. As such, the valve must cycle 210 times.

Operational durability is an extremely important aspect of all products manufactured for agricultural uses. For the case of the flood irrigation system, the exemplary application (of alfalfa production in Cedarville, Calif.) may require a 30-year life cycle. In order to test this requirement a simple cycle test will be needed. The growing season in Cedarville, Calif. only requires seven flooding occurrences a year. This translates to a 210 life cycle. One cycle is defined as the valve going from a completely closed position to fully open then back to completely closed. In order to conduct this test the automated flood valve needs to be fully assembled, with a fully charged battery. The system was tested in facilities that have standard Waterman valves.

List of Equipment:
Automated flood irrigation valve
Waterman valve adaptor
4½×13 4 inch bolt
4½×13 nuts
Socket Set
Box wrench set
25 foot gas hose with ⅜ inch ends
Campbell Hausfield H-3861 or equivalent gas compressor
1 gallon of soapy water The valve closes with approximately 700 pounds of force, so precaution should be taken to prevent limbs from being severed by the closing valve. This precaution includes keeping all limbs away from the pneumatically actuated lid. Proper ANSI Z 87.1 safety glasses should be worn at all times when operating the machinery.

The following procedure was used as the testing method:
1. Affix the Waterman valve adapter securely over the Waterman valve using the ACME screw utilized by the existing Waterman valve.
2. Using the ½×13 bolts, associated sockets, and box wrenches secure the automated flood valve to the waterman valve adapter.
3. Connect one side of the ⅜ inch gas hose to the regulator and the other end to the gas compressor.
4. Turn on the gas compressor and charge to line to 22 psi.
5. Coat all gas fittings with soapy water and carefully inspect them to ensure no leaks are present.
6. Turn on the automated flood valves electronic system using the toggle switch located in the upper control box.
7. Once the system is powered up hold the center push button
8. Select automatic operation mode.
9. Select cycle test.
10. Let the system cycle for 250 cycles.
11. After each cycle inspect the system for damage.
12. Report any abnormalities encountered and where they occurred. In the event of a failure stop the pump and cease the test immediately.

The cycle test was completed successfully and only resulted in a minor scratching on the powder coating after 250 cycles.

Test 2—Water Sensing Unit:

The objective is to verify that the water-sensing unit can detect the presence of water at a certain depth (e.g., at least ½") and confirm that the water-sensing unit can communicate wirelessly at a certain range (e.g., at least 800').

One of the most crucial components of the flood irrigation system is the water-sensing unit. Once the unit detects water at a certain depth, it proceeds to tell the riser valve to close, thus stopping the flow of water over the crop. If the water is not sensed soon enough, or the detection is not communicated, the consequence is an unsatisfactory irrigation cycle. This test plan was designed to ensure the successful operation of the water-sensing unit. This test was performed on a field with access to a main line riser (water source).

When water bridges the terminals on the sensor, an LED will be illuminated onboard the microcontroller (MCU); this LED is used to verify water detection. Likewise, when the detection is made, the MCU will communicate wirelessly to an identical MCU, illuminating that MCU's LED. In this test experiment, detection and communication is treated as two separate parts. While testing the wireless communication aspect of the system, a standalone MCU with a battery pack will represent the riser valve.

It is noted that this test plan assumes that the end-user will properly place the water-sensing unit according to the user manual provided. Poor placement could lead to faulty operation.

List of Equipments:
8 AA batteries
12" plastic ruler
30' measuring tape
1 roll of paper towels
1 small bucket
Post driver
Post puller
Multimeter accurate to 0.1 V DC
10" measuring wheel with 10,000' capacity While inserting batteries into the MCUs' battery holders, test engineers should mind the polarity symbols marked on the batteries and the holders. If inserted incorrectly, the batteries could ruin the equipment or even explode, releasing their toxic contents. Test engineers should wear lab goggles at all times. Before beginning the procedure, test engineers should study the following figures to become familiar with the MCU's connectors, jumpers, and switches, as well as the field operations equipment.

The following procedure was used as the testing method related to water detection.
1. Arrive at the site and proceed to designated field with alfalfa valves attached to irrigation mainline.
2. Using post driver and surveyor measuring tape, drive sensor T-post 5 feet away from the alfalfa valve, making sure to be on the downhill side.
3. Attach electronic box to T-post via the mounting screws.
4. Assure that the main power switch on the water-sensor unit's MCU is in the USB/DC position, and that LED enable DIP switch 1 is on, and 2 is off.
5. Correctly insert 4 AA batteries into the water-sensor unit's MCU.
6. Slide the main power switch on the board from USB/DC to BATT, turning the unit on. A blue LED next to the switch should become illuminated.
7. Using the multimeter, probe the voltage between the SV power connector, and GND. If the reading is less than 4.SV, check the battery placement, and voltage. Don't continue until the voltage reads 4.SV or more.
8. By hand, drive sensor and mounting steaks into the field, confirming with a measuring tape that it is located 5' away from the alfalfa valve and that a ½ inch gap exists between the soil and the sensors bottom edge. Also confirm with level that the sensor is as level to the ground as possible.
9. Drive the ruler into the ground so that that it is perpendicular to the bottom of the sensor, making sure that the ruler is standing straight up. The back of the ruler should be flush with the sensor.
10. Slowly open alfalfa valve handle and allow water to begin running down the field towards the sensor.
11. Monitor the sensor, and continue until the red LED lights up on the MCU.
12. Record the depth of the water in the appropriate section of the datasheet.
13. Flip main power switch on the water-sensor unit's MCU to the USB/DC position (off), and close the alfalfa valve.
14. Remove the sensor and wipe dry with the paper towels.
15. Remove electronic box from T-post, and use the post puller to remove T-post form the ground.
16. Repeat steps 8-15, however this time drive sensor and T<post 10 feet away from alfalfa valve. Mark the results in the appropriate section of the data sheet. Run test a third time, moving post and sensor out to 15 feet. Mark the results in the appropriate section of the datasheet.
17. If any issues arose during testing, or if any additional comments are necessary, record them in the additional notes section of the data sheet (excessive debris collection on sensor, mis-trigger of sensor, etc.).
18. Fill the bucket with water.

19. Dip the sensor in and out of the water and observe the behavior of the red LED. Mark the results in the appropriate section of the datasheet.

The following procedure was used as the testing method related to wireless communication:

20. Repeat steps 4-7 for the MCU representing the riser. At this point, both units should be on and both units' red LEDs should be off.

21. Submerge the water-sensor. The red LEDs on both units should light up. The red LED on the riser MCU signifies wireless communication.

22. Taking the riser MCU in one hand, and the measuring wheel in the other, begin to walk in a straight line away from the water-sensor unit. Continue walking until the red LED on the riser MCU goes off. At this point, wireless communications have been lost (if limited area is available, this test can be concluded after 800 feet). Record the reading on the measuring wheel in the appropriate section of the datasheet.

23. Turn both units off.

24. Mark any additional notes in the appropriate section of the datasheet.

25. This concludes the test procedure.

It was determined that both tests met and surpassed the specification.

Test 3—Riser Pressure Test:

The objective is to verify that riser will work at a max water line pressure of 20 psi. As such, the riser is tested with max water pressure at 20 psi.

In the field, the riser will be exposed to various flow rates and pressures based on the time of year. In the exemplary application, the field's normal operating conditions in the summer are approximately 10 feet of head. This results in a static pressure of approximately 4 psi on the lid. In the winter the head can reach up to 15 feet, which results in about 6.5 psi. The spring and riser structure should operate without leaks at this pressure.

Taking the pressure of 6.5 psi and multiplying it by the area, the corresponding force is determined. This force will be replicated with a use of a hydraulic press. The diameter of the main line is 12 inches, therefore, based on the max field pressure of 6.5 psi, this gives a force of 735 lbs. The spring was tested at this pressure to make sure that it can hold back the water pressure. The factor of safety was determined when the air spring is filled to 20 psi.

Because the hydraulic press has a very high cut in reading for the gauge, a spring will need to be placed between the test fixture and the press. The deflection will be measured when a crack is seen between the rubber and the main pipe, as if there would be a leak in the pipe.

List of Equipments:
Hydraulic press
Riser System Set up
Welder large enough to weld 3/16 inch steel
Test Fixture
Crescent wrench
Socket Wrench Set
Gas compressor
Stiff Spring with a known spring constant
Safety Glasses
Ear Protection The following procedure was used as the testing method.

1. Test fixture must be fabricated if not already made. See drawings attached in the back of test document.

2. Fabricate testing jig shown in drawings.

3. Disassemble lid and air spring from standard riser, and take support structure off of the base frame using socket wrench and crescent wrench, then attach air spring and lid to the test fixture, and test fixture to base frame. Make sure to place testing jig into the riser assembly that will transmit load to the lid.

4. Place fully assembled test fixture in the hydraulic press upside down.

5. Inflate the air spring to approximately 22 psi to seal the 12 inch main line.

6. Take the spring and place it in between the testing jig and the press. If the spring does not have flat ends, place two flat pieces of steel on either end.

7. Measure the fully extended length of the spring, record length. If the ends are not flat, measure and record the four corners of the flat plate.

8. Start applying force slowly in order to confirm that everything is properly situated.

9. Apply force until there is a slight gap between the 12 in main line, and the rubber gasket on the lid.

10. Take the compressed measurement. Similar to step 7.

11. Release spring and put the original riser together.

FIG. 7 illustrates an exemplary graph showing force vs. displacement under a pressure test for a riser assembly of a flood irrigation system according to an embodiment.

As discussed above, a hydraulic press was used to compress the air spring until a leak developed in the pressure test. A spring was used to determine the force placed on the lid. Testing concluded that a 0.75" deflection was the max that the air spring could sustain without developing a leak with a 20 psi pressure. Once the deflection was determined, the spring constant needed to be solved for. A tension tester was used to produce a force vs displacement curve, as shown in FIG. 7.

From this curve, it can be determined that the air spring sustained a 925 lb force. This is larger than the 750 lb force that was required. This yields a factor of safety of 1.2. Therefore, the test was a success.

Figure 11:
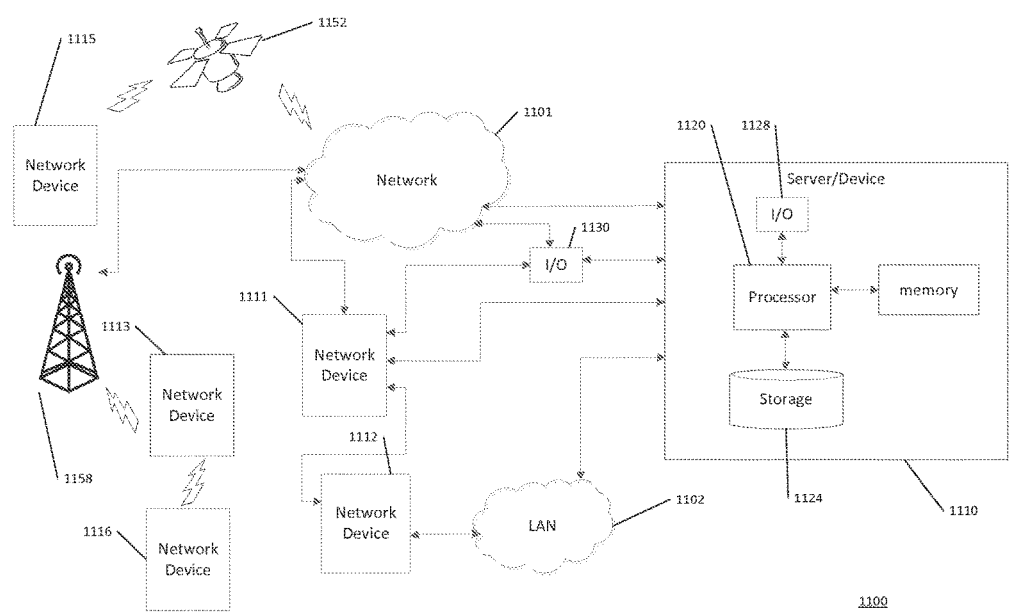
FIG. 11 illustrates an exemplary block diagram of a communication network for a flood irrigation system according to an embodiment.

FIG. 11 illustrates an exemplary block diagram of a communication network according to an embodiment.

Referring to FIG. 11, communication network 1100 includes one or more networks, including wide-area network 1101, e.g., the Internet, company or organization intranet, and/or sections of the Internet (e.g., virtual private networks, cloud, and the deep), and local-area network 1102. e.g., interconnected computers localized at a geographical and/or organization location and ad-hoc networks connected using various wired means, e.g., Ethernet, coaxial, fiber optic, and other wired connections, and wireless means, e.g., Wi-Fi, Bluetooth, and other wireless connections. Communication network 1100 includes a number of network devices 1110-1115 that are in communication with the other devices through the various networks 1101 and 1102 and through other means, e.g., direct connection through an input/output port of a network device 1130, direct connection through a wired or wireless means, and indirect connection through an input-output box, e.g., a switch.

Network devices 1110-1115, which may also connect through the networks 1101 and 1102 using various routers, access points, and other means. For example, network device 1113 wirelessly connects to a base station 1158, which acts as an access point to the wide area network 1101. Base station 1158 may be a cellular phone tower, a Wi-Fi router or access point, or other devices that allow a network device, e.g., wireless network device 1113, to connect to a network. e.g., wide area network 1101, through the base station 1158. Base station 3158 may be connected directly to network 1101 through a wired or wireless connection or may be routed through additional intermediate service providers or exchanges. Wireless device 1113 connecting through base station 1158 may also act as a mobile access point in an ad-hoc or other wireless network, providing access for network device 1115 through network device 1113 and base station 1158 to network 1101.

In some scenarios, there may be multiple base stations, each connected to the network 1101, within the range of network device 1113. In addition, a network device, e.g., network device 1113, may be travelling and moving in and out of the range of each of the multiple base stations. In such case, the base stations may perform handoff procedures with the network device and other base stations to ensure minimal interruption to the network device's connection to network 1101 when the network device is moved out of the range of the handling base station. In performing the handoff procedure, the network device and/or the multiple base stations may continuously measure the signal strength of the network device with respect to each base station and handing off the network device to another base station with a high signal strength to the network device when the signal strength of the handling base station is below a certain threshold.

In another example, a network device, e.g., network device 1115, may wirelessly connect with an orbital satellite 1152, e.g., when the network device is outside of the range of terrestrial base stations. The orbital satellite 1152 may be wirelessly connected to a terrestrial base station that provides access to network 1101 as known in the art.

In other cases, orbital satellite 1152 or other satellites may provide other functions such as global positioning and providing the network device with location information or estimations of location information of the network device directly without needing to pass information to the network 1101. The location information or estimation of location information is known in the art. The network device may also use geolocation methods, e.g., measuring and analyzing signal strength, using the multiple base stations to determine location without needing to pass information to the network 1101. In an embodiment, the global positioning functionality of the orbital satellite 1152 may use a separate interface than the communication functionality of the orbital satellite 1152 (e.g., the global position functionality uses a separate interface, hardware, software, or other components of the network device 1113 than the communication functionality). In another embodiment, the orbital satellite with the global position functionality is a physically separate satellite from the orbital satellite with communication functionality.

In one scenario, network device, e.g., network device 1112, may connect to wide area network 1101 through the local area network 1102 and another network device, e.g., network device 1110. Here, the network device 1110 may be a server, router, gateway, or other devices that provide access to wide area network 1101 for devices connected with local area network 1102.

Figure 12:
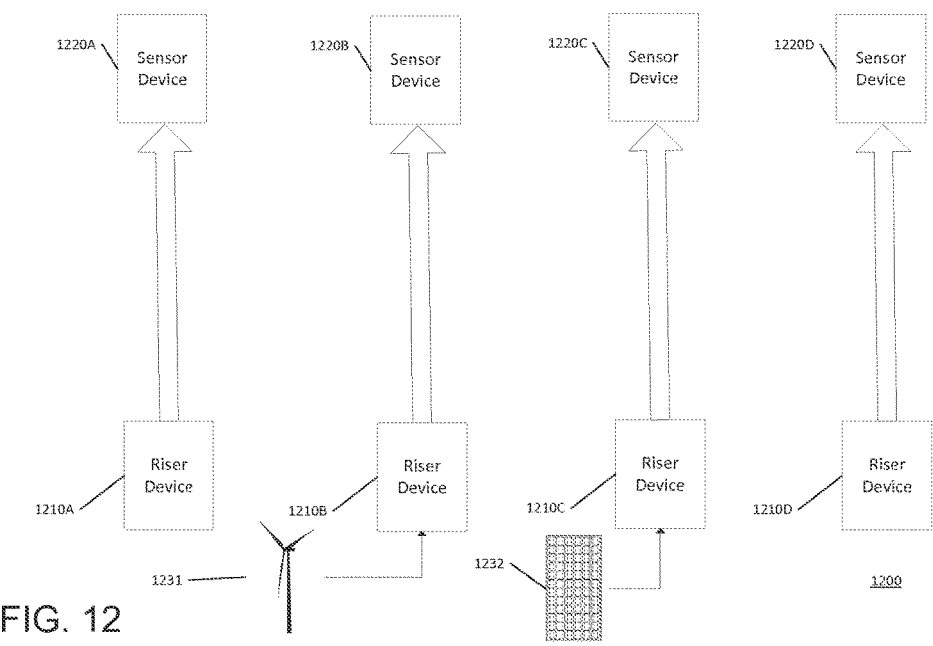
FIG. 12 illustrates an exemplary diagram of a flood irrigation system according to an embodiment.

FIG. 12 illustrates an exemplary diagram of a flood irrigation system according to an embodiment.

Referring to FIG. 12, flood irrigation system 1200 may be deployed in a number of fields that uses irrigation. The flood irrigation system 1200 includes a number of riser devices 1210A-D and corresponding sensor devices 1220A-D. Each of the riser devices 1210A-D and sensor devices 1220A-D may be powered by a number of ways as known now or may be later derived (e.g., wind turbine 1231, solar panel 1232, batteries, electrical cabling, etc.).

It is noted here that flood irrigation system 1200 may include a plurality of the riser devices 1210A-D, which each may include the riser assembly 110 of the flood irrigation system 100, and a plurality of the corresponding sensor devices 1220A-D, which each may include the sensor assembly 120). As such, the flood irrigation system 100 as shown in FIG. 1 includes a set of the riser assembly 110 and the sensor assembly 120 for a section of a field being deployed in, while the flood irrigation system 1200 as shown FIG. 12 may include multiple flood irrigation systems 100 for one or more section (or whole) of a field being deployed in.

The flood irrigation system 1200 may be deployed in the field in a variety of arrangements. In a preferred embodiment, a riser device 1210A is placed at a higher end of a slopped field. The corresponding sensor device 1220A is placed at the lower end of a slopped field. When riser device 1210A is activated, water flows from the riser device 1210A at the higher end of the field to the lower end assisted by gravity. The water is detected by the sensor device 1220A at the lower end of the field. The other riser devices 1210B-D and the corresponding sensor devices 1220B-D may be placed at adjacent fields. For example, in a configuration, in fields separated by borders, each riser devices 1210A-D and the corresponding sensor devices 1220A-D are deployed in one of the fields. In other configurations, the riser devices 1210A-D and the corresponding sensor devices 1220A-D may be placed as needed.

In an embodiment, the various components of the flood irrigation system 1200 (e.g., sensor devices 1220A-D, riser devices 1210A-D) may be available as a kit for modifying or working with an existing flood irrigation system. For example, sensor devices 1220A-D may be added to an existing flood irrigation system at the end of the irrigation path. The riser devices 1210A-D may be added to replace the existing riser devices in the existing flood irrigation system. The existing riser devices may have electronics added to obtain the same functionalities as the riser devices 1210A-D.

Further, the riser devices 1210A-D are used herein as an exemplary embodiment. In other embodiments, other devices that correspond with the control of water flow (e.g., gates, sprinklers, pumps) as now known or may be later derived may be used.

Figure 13:
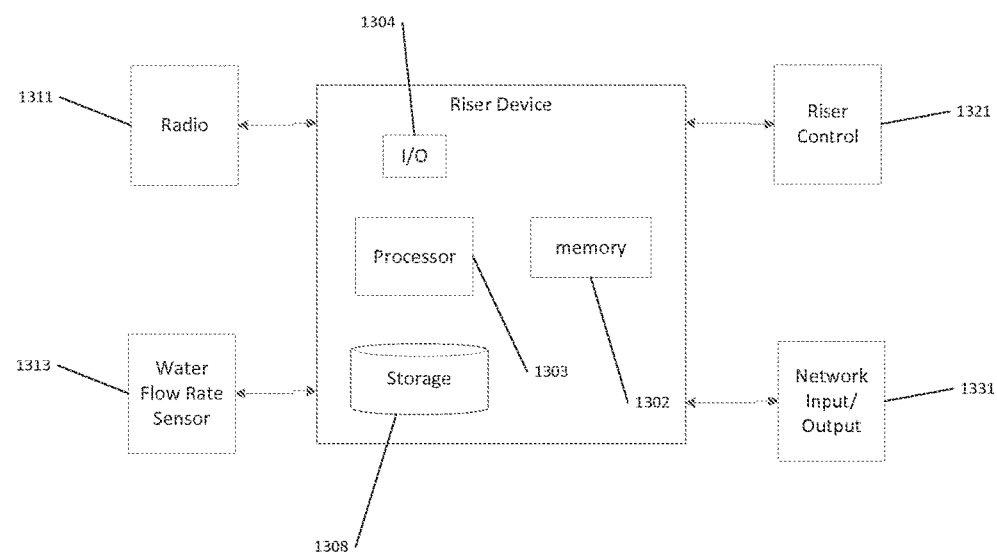
FIG. 13 illustrates an exemplary block diagram of a riser device for a flood irrigation system according to an embodiment.

FIG. 13 illustrates an exemplary block diagram of a riser device for a flood irrigation system according to an embodiment.

Referring to FIG. 13, a riser device 1300 may include electronic components that include one or more processors 1303, storages 1308, memories 1302, and input and output interfaces 1304. A riser device may or may not contain all of the above components depending on the purpose and use of the device. For example, the electronic components of a riser device 1300 may only be a dummy terminal that only requires an input and an output interface to send the input and receive the output from a device that contains a processor for processing the input and outputs.

In a further embodiment, the riser device 1300 may be connected with one or more displays, peripheral devices, and input devices. Displays may be visible screens, audible speakers, Braille text devices, or other devices that output information to a user. Peripheral devices may include printers, external storages, and other devices. Input devices may include keyboards, mice, and other input devices to input information to the device 1300. The one or more devices may be connected with or integral to the device 1300. For example, a riser device 1300 may have an integrated display which may pull up an input device, e.g., a soft keyboard, in a touch screen of the display. Another device may have a separate display monitor connected to a display port, e.g., VGA, DVI, and HDMI, of the riser device 300 and a hardware keyboard connected to the riser device 1300 through an input port. e.g., keyboard port and USB. The displays, peripheral devices, and input devices facilitate local user input and output at the location of the riser device 1300.

In an embodiment, riser device 1300 may include network input and output interfaces 1331 for communication through communication network 1101 as one of the network devices 1110-1115. Network interfaces 1331 may include wired and wireless interfaces, as described with respect to FIG. 11, that connect the riser device 1300 to a network or other devices. The network interfaces 1331 are used to receive input (e.g., instructions) to the riser device 1300 and transmit output (e.g., device status and updates) from the riser device 1300 to the network or other devices.

In an embodiment, riser device 1300 may include a radio 1311. Radio 1311 is configured for local (e.g., short-range) communication with local devices (e.g., a corresponding sensor device) without the need to communicate through the network 1101. In an embodiment, the radio 1311 may be used in complement to the network input and output interfaces 1331. For example, radio 1311 may be used exclusively for communication with the corresponding sensor device while other communications are sent and received through the network input and output interfaces 1331. In another example, radio 1311 may be used as a back-up communication option (e.g., if network 1101 is unavailable).

In an embodiment, the riser device 1300 may be able to control various mechanical components of the riser that control the functionalities of the riser. The riser control 1321 may include functionalities for controlling valves (e.g., for controlling the water flow rate) and other components of the riser.

In an embodiment, riser device 1300 may include or receive inputs from a number of sensors for procession and to transmit through the network. The riser device 1300 may include or receive input from water flow rate sensor 1313 for sensing the water flow rate from the riser. For example, the water flow rate may be used to measure and control the amount of water flowing from the riser. In one configuration, if the water flow rate is above a pre-determined amount, the riser device 1300 may control valves of the riser in order to slow the water flow rate to below the pre-determined amount (e.g., through the riser control 1321). In another configuration, if the water flow rate is below a pre-determined amount, the riser device 1300 may initiate a process to increase the water flow rate. For example, if the water source is linked to and is currently in use by other devices (e.g., another riser), the riser device 1300 may communicate with the other devices (e.g., through radio 1311 or network interfaces 1331) to facilitate the sharing of the water supply (e.g., shutting off the other devices or arrange an equitable distribution). The riser device 1300 may further raise an alert to a user defined method (e.g., email, text message, phone call) of the status of the riser device 300 and the water flow rate through the network 1101.

In a further embodiment, the riser device 1300 may include an irrigation table (e.g., stored in the storage 1308) that includes irrigation parameters such as recommended moisture level, consumptive use rate, irrigation frequency, and other parameters. In an embodiment, these parameters may be automatically downloaded from a network location (e.g., figures given at the U.S. Department of Agriculture website) through the network 1101. These figures may be used to set the water flow rate amount as discussed above. In an embodiment, the figures may also be used to automatically determine the frequency of running the flood irrigation system 1200 and the riser device 1300. Further, the riser device 1300 may send the parameters or a specific parameter to the sensor device to set the sensor device to consider a detection of the water flow only when the water has reached a certain concentration or depth.

In another embodiment, the riser device 1300 may further include one or more sensors for reading the soil moisture (e.g., to direct stopping the flow of water if the soil is wet), the instantaneous flow of water, the volume of water that has flowed from any riser device (e.g., riser devices 1210A-1210D), the amount of any fertilizer, pesticide, herbicide, or other substances that was added to the irrigation water flow (e.g., for controlling an amount of the substances being added to the irrigation water flow), the humidity, the wind speed and/or direction, the solar radiation, and rainfall. In an embodiment, such readings may be included in the calculation or determination of the figures as discussed above.

In an embodiment, conditions of the riser device 1300 (e.g., open and close state of the riser device and the elapsed time since the current state (open/close) of the riser device) or readings from the sensors or other parameters/calculations as discussed above may be displayed and/or communicated in the display, communicated through the communication network 1101 (e.g, viewable at a web browser, cell phone alerts), or communicated through other means as known now or may be later derived. In another embodiment, the displayed and/or communicated information may include information gathered by and/or regarding other riser devices (e.g., riser devices 1210A-1210D) and/or sensor devices (e.g., sensor devices 1220A-1220D) and aggregated to provide more substantive overview and/or convenient information.

In an embodiment, the riser device 1300 may raise an alert to a user defined method (e.g., email, text message, phone call, app) of the status of the riser device 1300 and the water flow rate sensor 1313 (or other sensors). For example, if the water flow rate sensor 1313 has detected an abnormal water flow rate, which may be predetermined or calculated through the irrigation parameters, an alert may be sent to the user alerting for possible malfunction or maintenance issues.

In an embodiment, the riser device 1300 may substantially correspond to the electronics of the riser assembly 110 (e.g., the electronics 130 and other components) as shown in FIG. 1.

Figure 14:
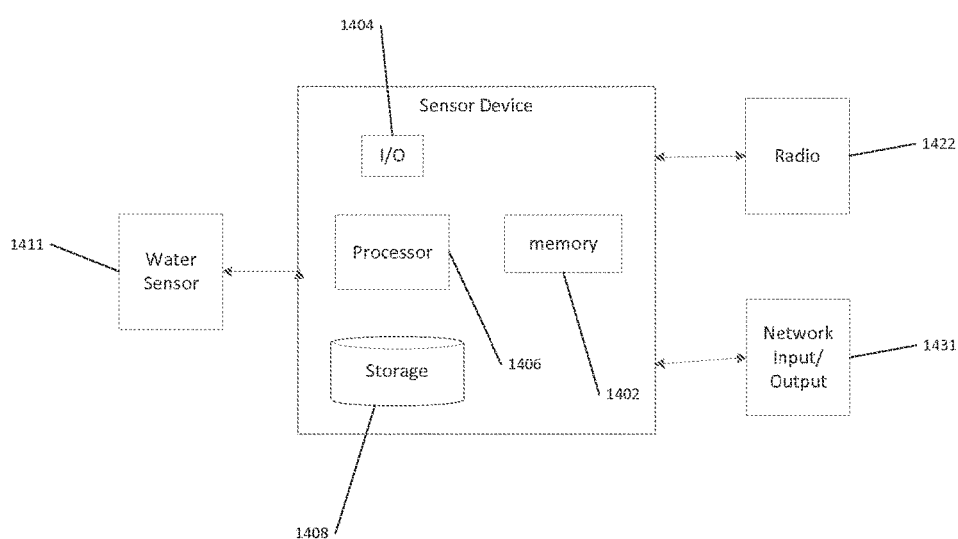
FIG. 14 illustrates an exemplary block diagram of a sensor device for a flood irrigation system according to an embodiment.

FIG. 14 illustrates an exemplary block diagram of a sensor device for a flood irrigation system according to an embodiment.

Referring to FIG. 14, a sensor device 1400 may include electronic components that include one or more processors 1406, storages 1408, memories 1402, and input and output interfaces 1404. A riser device may or may not contain all of the above components depending on the purpose and use of the device. For example, the electronic components of a sensor device 1400 may only be a dummy terminal that only requires an input and an output interface to send the input and receive the output from a device that contains a processor for processing the input and outputs.

In a further embodiment, the sensor device 1400 may be connected with one or more displays, peripheral devices, and input devices. Displays may be visible screens, audible speakers, Braille text devices, or other devices that output information to a user. Peripheral devices may include printers, external storages, and other devices. Input devices may include keyboards, mice, and other input devices to input information to the device 1400. The one or more devices may be connected with or integral to the device 400. For example, a sensor device 1400 may have an integrated display which may pull up an input device, e.g., a soft keyboard, in a touch screen of the display. Another device may have a separate display monitor connected to a display port, e.g., VGA, DVI, and HDMI, of the sensor device 400 and a hardware keyboard connected to the sensor device 1400 through an input port, e.g., keyboard port and USB. The displays, peripheral devices, and input devices facilitate local user input and output at the location of the sensor device 1400.

In an embodiment, sensor device 1400 may include network input and output interfaces 1431 for communication through communication network 1101 as one of the network devices 1110-1115. Network interfaces 1431 may include wired and wireless interfaces, as described with respect to FIG. 11, that connect the sensor device 1400 to a network or other devices. The network interfaces 1431 is used to receive input (e.g., instructions) to the sensor device 1400 and transmit output (e.g., device status and updates) from the sensor device 1400 to the network or other devices.

In an embodiment, sensor device 1400 may include a radio 1422. Radio 1422 is configured for local (e.g., short-range) communication with local devices (e.g., a corresponding riser device) without the need to communicate through the network 1101. In an embodiment, the radio 1422 may be used in complement to the network input and output interfaces 1431. For example, radio 1422 may be used exclusively for communication with the corresponding sensor device while other communications are sent and received through the network input and output interfaces 1431. In another example, radio 1422 may be used as a back-up communication option (e.g., if network 1101 is unavailable).

In an embodiment, sensor device 1400 may include or receive inputs from a number of sensors for procession and to transmit through the network. The sensor device 1400 may include or receive input from water sensor 1411 for sensing the water from the riser. The water sensor 1411 may be of a type known now or later derived. For example, the water sensor 1411 may detect water of a certain concentration or at a certain depth in the field, which may be set to a pre-determined amount for activating the sensors of water sensor 1411.

In a further embodiment, the sensor device 1400 may include an irrigation table (e.g., stored in the storage 1408) that includes irrigation parameters such as recommended moisture level, consumptive use rate, irrigation frequency, and other parameters. In an embodiment, these parameters may be automatically downloaded from a network location (e.g., figures given at the U.S. Department of Agriculture website) through the network 1101. In an embodiment, the figures may be used to automatically determine the detection setting of the water sensor 1411 (e.g., water depth). Further, the sensor device 1400 may receive the parameters or a specific parameter from the riser device.

In another embodiment, the sensor device 1400 may further include one or more sensors for reading the soil moisture (e.g., to direct stopping the flow of water if the soil is wet), the instantaneous flow of water, the volume of water that has flowed from any riser device (e.g., sensor devices 1220A-1220D), the amount of any fertilizer, pesticide, herbicide, or other substances that was added to the irrigation water flow (e.g., for controlling an amount of the substances being added to the irrigation water flow), the humidity, the wind speed and/or direction, the solar radiation, and rainfall. In an embodiment, such readings may be included in the calculation or determination of the figures as discussed above.

In an embodiment, readings from the sensors or other parameters/calculations as discussed above may be displayed and/or communicated in the display, communicated through the communication network 1101 (e.g, viewable at a web browser, cell phone alerts), or communicated through other means as known now or may be later derived. In another embodiment, the displayed and/or communicated information may include information gathered by and/or regarding other riser devices (e.g., riser devices 1220A-1220D) and/or sensor devices (e.g., sensor devices 1220A-1220D) and aggregated to provide more substantive overview and/or convenient information.

In an embodiment, the sensor device 1400 may raise an alert to a user defined method (e.g., email, text message, phone call, app) of the status of the sensor device 1400 and the water sensor 1411 (or other sensors). For example, if the water sensor 1411 has not detected water after a certain time period, which may be predetermined or calculated through the irrigation parameters, an alert may be sent to the user alerting for possible malfunction or maintenance issues.

In an embodiment, the sensor device 1400 may substantially corresponds to the electronics of the sensor assembly 120 (e.g., the electronics 122) as shown in FIG. 1.

Figure 15:
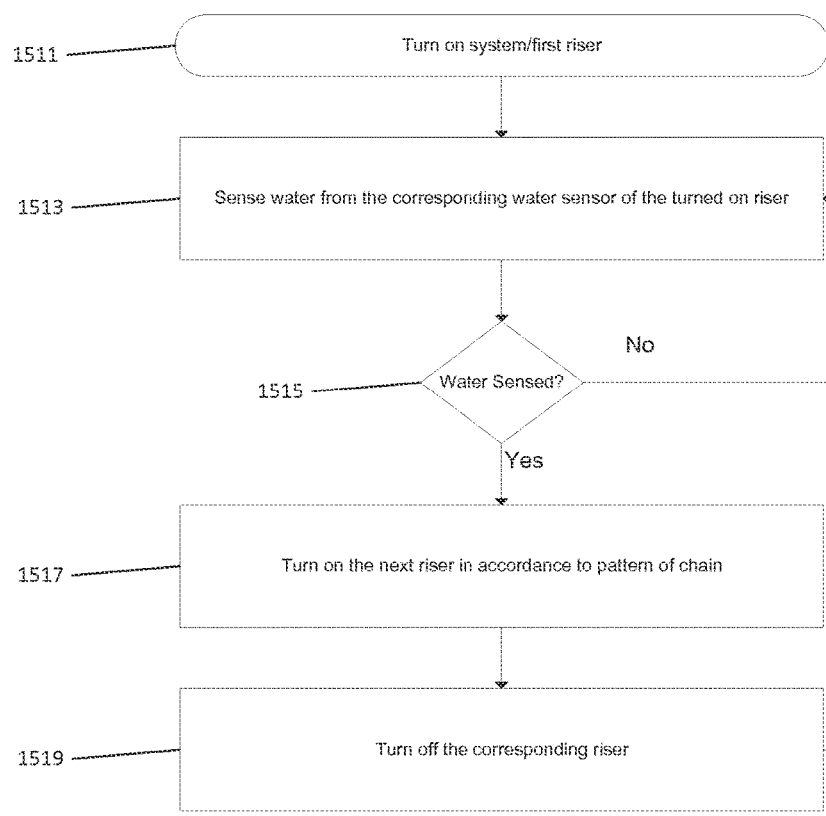
FIG. 15 illustrates an exemplary flow diagram of a flood irrigation process for a flood irrigation system according to an embodiment.

FIG. 15 illustrates an exemplary flow diagram of a flood irrigation process for a flood irrigation system according to an embodiment.

Referring to FIG. 15, the flood irrigation process 1500 starts with turning on the flood irrigation system 1511 (e.g., flood irrigation system 1200). As discussed with respect to FIG. 12, the flood irrigation system 1200 has been deployed prior to the start of the flood irrigation process 1500 and has a pre-defined arrangement of the riser devices 1210A-D and the corresponding sensor devices 1220A-D. For example, the arrangement as illustrated in FIG. 2, which includes a riser device and the corresponding sensor device at each bordered block of field where the next riser device and the corresponding sensor device is placed at the next bordered block of field across the entire length of the field, may be used.

The flood irrigation starts with the first riser (e.g., riser device 1210A) turned on. As water flows from the first riser at the first end, the water flows to the second end irrigating the field in between the ends.

Next, the water is sensed by the corresponding water sensor of the turned on riser device 1513. As discussed, the corresponding water sensor (e.g., sensor device 1220A) is placed at the second end of the irrigating field. As the water from the riser flows to the second end, the water is sensed by the water sensor.

In decision diamond 1515, if the water is not sensed by the water sensor, the flood irrigation process 1500 returns to step 1513 to continue sensing for the water (e.g., water from the riser has not yet reached the second end). If water is sensed, the flood irrigation process 1500 moves on to step 1517.

In step 1517, the next riser is turned on in accordance with a pattern or an arrangement of the riser devices. For example, in the arrangement as illustrated in FIG. 12, the pattern moves to turn on the riser device 1210B during the turning off the riser device 1210A.

Next, the riser is turned off after the water is sensed 1519. In an embodiment, the sensor device may inform the riser device of the sensed water through the radio 1422 or through the network 1101. This prompts the riser device to turn off the water flow and thus would prevent water run-off after the field has been irrigated.

After the step 1519, the flood irrigation process 1500 cycles back to step 1513 to sense the water was the corresponding sensor device of the turned on riser. For example, if riser device 1210B is turned on in step 1517, the water would be sensed by the sensor device 1220B in the step 1513 after the step 1519. In an embodiment, when the cycle reaches the end of the arrangement (e.g., riser device 1210D is turned off in the previous step 1519), the pattern may cycle back to the first riser device (e.g., riser device 1210A). The flood irrigation process 1500 may be manually turned off by a user at any point in the process (e.g., when all the fields are thoroughly irrigated).

In an embodiment, a user may program or set the pattern according to a customized arrangement of the riser and sensor devices. For example, the user may set an arrangement pattern of irrigation for every other field (e.g., 1210A and 1210C). This may be useful where various types of crops are grown on each field, and some fields may only need to be irrigated half as much. The user may enter such programming using the local input and output 1304 of the riser device 1300 and local input and output 1404 of the sensor device 1400. In a further embodiment, multiple programming may be saved and activated from respective the storages 1308 and 1408. In an embodiment, the programming may be set to automatically run at various set times or detected conditions. For example, if it is determined that it has not rained for a certain period, a programming may run to irrigate the field with additional water.

In another embodiment, the user may program or set the pattern of the riser and sensor devices through the network 1101. For example, the user may use an application on a cell phone, computer, or other network devices to program the riser device 1300 and sensor device 1400. The application may contain a graphical interface of the field. In an embodiment, the user may set the actual deployed locations of the riser and sensor devices on the graphical interface and program the irrigation pattern.

Figure 16:
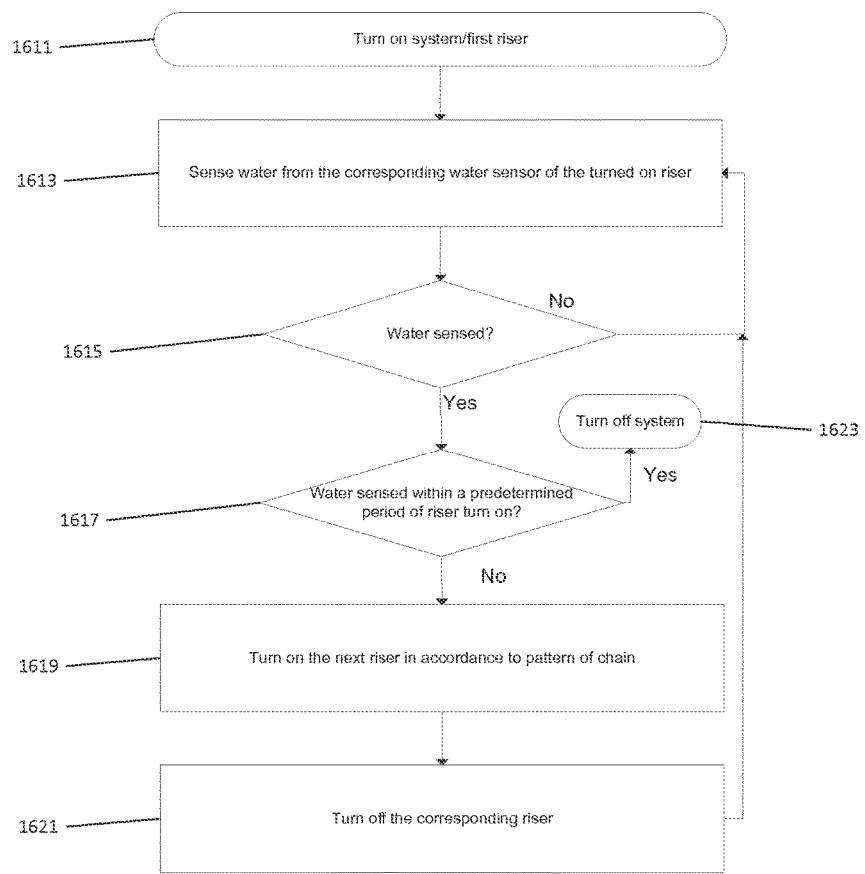
FIG. 16 illustrates an exemplary flow diagram of a flood irrigation process for a flood irrigation system according to an embodiment.

FIG. 16 illustrates an exemplary flow diagram of a flood irrigation process for a flood irrigation system according to an embodiment.

The flood irrigation process 1600 is similar to the flood irrigation process 1500 but with an added check to turn off the flood irrigation system after a certain time has elapsed with no sensing of water. For example, this may be due to a malfunction of one or more of the riser device or the sensor device.

Referring to FIG. 16, the flood irrigation process 1600 starts with turning on the flood irrigation system 1611 (e.g., flood irrigation system 1200). As discussed with respect to FIG. 12, the flood irrigation system 1200 has been deployed prior to the start of the flood irrigation process 1600 and has a pre-defined arrangements of the riser devices 1210A-D and the corresponding sensor devices 1220A-D. For example, the arrangement as illustrated in FIG. 12, which includes a riser device and the corresponding sensor device at each bordered block of field where the next riser device and the corresponding sensor device is placed at the next bordered block of field across the entire length of the field, may be used.

The flood irrigation starts with the first riser (e.g., riser device 1210A) turned on. As water flows from the first riser at the first end, the water flows to the second end irrigating the field in between the ends.

Next, the water is sensed by the corresponding water sensor of the turned on riser device 1613. As discussed, the corresponding water sensor (e.g., sensor device 1220A) is placed at the second end of the irrigating field. As the water from the riser flows to the second end, the water is sensed by the water sensor.

In decision diamond 1615, if the water is not sensed by the water sensor, the flood irrigation process 1600 returns to step 1613 to continue sensing for the water (e.g., water from the riser has not yet reached the second end). If water is sensed, the flood irrigation process 1600 moves on to decision diamond 1617.

In decision diamond 1617, if the water sensor did not sense any water after a predetermined period of time after the riser has turned on, the flood irrigation process 1600 moves to step 1623 to turn off the system. One effect of this is to prevent the flood irrigation system from continuously running in the event of malfunctions of the various devices. In an embodiment, the predetermined period of time may be set in accordance with the water run-off rate or other parameters as discussed above.

In step 1619, the next riser is turned on in accordance with a pattern or an arrangement of the riser devices. For example, in the arrangement as illustrated in FIG. 12, the pattern moves to turn on the riser device 1210B after turning off the riser device 1210A.

Next, the riser is turned off after the water is sensed 1621. In an embodiment, the sensor device may inform the riser device of the sensed water through the radio 1422 or through the network 1101. This prompts the riser device to turn off the water flow and thus would prevent water run-off after the field has been irrigated.

After the step 1621, the flood irrigation process 1600 cycles back to step 1613 to sense the water was the corresponding sensor device of the turned on riser. For example, if riser device 1210B is turned on in step 1619, the water would be sensed by the sensor device 1220B in the step 1613 after the step 1621. In an embodiment, when the cycle reaches the end of the arrangement (e.g., riser device 1210D is turned off in the previous step 1621), the pattern may cycle back to the first riser device (e.g., riser device 1210A). The flood irrigation process 1600 may be manually turned off by a user at any point in the process (e.g., when all the fields are thoroughly irrigated).

In an embodiment, a user may program or set the pattern according to a customized arrangement of the riser and sensor devices. For example, the user may set an arrangement pattern of irrigation for every other field (e.g., 1210A and 1210C). This may be useful where various types of crops are grown on each field, and some fields may only need to be irrigated half as much. The user may enter such programming using the local input and output 1304 of the riser device 1300 and local input and output 1404 of the sensor device 1400. In a further embodiment, multiple programming may be saved and activated from respective the storages 1308 and 1408. In an embodiment, the programming may be set to automatically run at various set times or detected conditions. For example, if it is determined that it has not rained for a certain period, a programming may run to irrigate the field with additional water.

In another embodiment, the user may program or set the pattern of the riser and sensor devices through the network 1101. For example, the user may use an application on a cell phone, computer, or other network devices to program the riser device 1300 and sensor device 1400. The application may contain a graphical interface of the field. In an embodiment, the user may set the actual deployed locations of the riser and sensor devices on the graphical interface and program the irrigation pattern.

Figure 17:
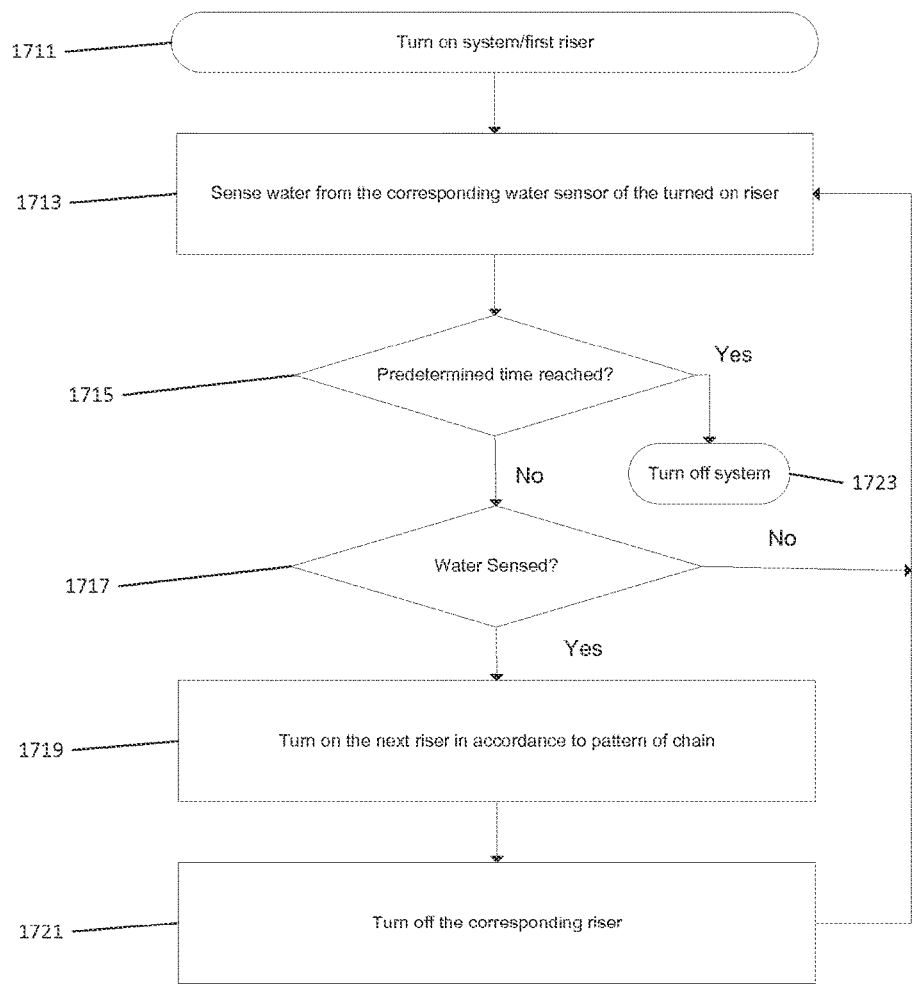
FIG. 17 illustrates an exemplary flow diagram of a flood irrigation process for a flood irrigation system according to an embodiment.

FIG. 17 illustrates an exemplary flow diagram of a flood irrigation process for a flood irrigation system according to an embodiment.

The flood irrigation process 1700 is similar to flood irrigation process 1500 but with an added check to turn off the flood irrigation system after a certain time has elapsed. For example, this may be due to a malfunction of one or more of the riser devices or the sensor device or due to water restriction limiting the amount of time a field may be irrigated.

Referring to FIG. 17, the flood irrigation process 1700 starts with turning on the flood irrigation system 1711 (e.g., flood irrigation system 1200). As discussed with respect to FIG. 12, the flood irrigation process 1600 has been deployed prior to the start of the flood irrigation process 1700 and has a pre-defined arrangements of the riser devices 1210A-D and the corresponding sensor devices 1220A-D. For example, the arrangement as illustrated in FIG. 12, which includes a riser device and the corresponding sensor device at each bordered block of field where the next riser device and the corresponding sensor device is placed at the next bordered block of field across the entire length of the field, may be used.

The flood irrigation starts with the first riser (e.g., riser device 1210A) turned on. As water flows from the first riser at the first end, the water flows to the second end irrigating the field in between the ends.

Next, the water is sensed by the corresponding water sensor of the turned on riser device 1713. As discussed, the corresponding water sensor (e.g., sensor device 1220A) is placed at the second end of the irrigating field. As the water from the riser flows to the second end, the water is sensed by the water sensor.

In decision diamond 1715, if a predetermined period of time after the riser has turned on has passed, the flood irrigation process 1700 moves to step 1723 to turn off the system. One effect of this is to prevent the flood irrigation system from continuously running in the event of malfunctions of the various devices or due to water restriction limiting the amount of time a field may be irrigated. In an embodiment, the predetermined period of time may be set in accordance with the water run-off rate or other parameters as discussed above.

In decision diamond 1717, if the water is not sensed by the water sensor, the flood irrigation process 1700 returns to step 1713 to continue sensing for the water (e.g., water from the riser has not yet reached the second end). If water is sensed, the flood irrigation process 1700 moves on to decision diamond 1717.

In step 1719, the next riser is turned on in accordance with a pattern or an arrangement of the riser devices. For example, in the arrangement as illustrated in FIG. 12, the pattern moves to turn on the riser device 1210B after turning off the riser device 1210A.

Next, the riser is turned off after the water is sensed 1721. In an embodiment, the sensor device may inform the riser device of the sensed water through the radio 1422 or through the network 1101. This prompts the riser device to turn off the water flow and thus would prevent water run-off after the field has been irrigated.

After the step 1721, the flood irrigation process 1700 cycles back to step 1713 to sense the water was the corresponding sensor device of the turned on riser. For example, if riser device 1210B is turned on in step 1719, the water would be sensed by the sensor device 1220B in the step 1713 after the step 7121. In an embodiment, when the cycle reaches the end of the arrangement (e.g., riser device 1210D is turned off in the previous step 1721), the pattern may cycle back to the first riser device (e.g., riser device 1210A). The flood irrigation process 1700 may be manually turned off by a user at any point in the process (e.g., when all the fields are thoroughly irrigated).

In an embodiment, a user may program or set the pattern according to a customized arrangement of the riser and sensor devices. For example, the user may set an arrangement pattern of irrigation for every other field (e.g., 1210A and 1210C). This may be useful where various types of crops are grown on each field, and some fields may only need to be irrigated half as much. The user may enter such programming using the local input and output 1304 of the riser device 1300 and local input and output 1404 of the sensor device 1400. In a further embodiment, multiple programming may be saved and activated from respective the storages 1308 and 1408. In an embodiment, the programming may be set to automatically run at various set times or detected conditions. For example, if it is determined that it has not rained for a certain period, a programming may run to irrigate the field with additional water.

In another embodiment, the user may program or set the pattern of the riser and sensor devices through the network 1101. For example, the user may use an application on a cell phone, computer, or other network devices to program the riser device 1300 and sensor device 1400. The application may contain a graphical interface of the field. In an embodiment, the user may set the actual deployed locations of the riser and sensor devices on the graphical interface and program the irrigation pattern.

Figure 18:
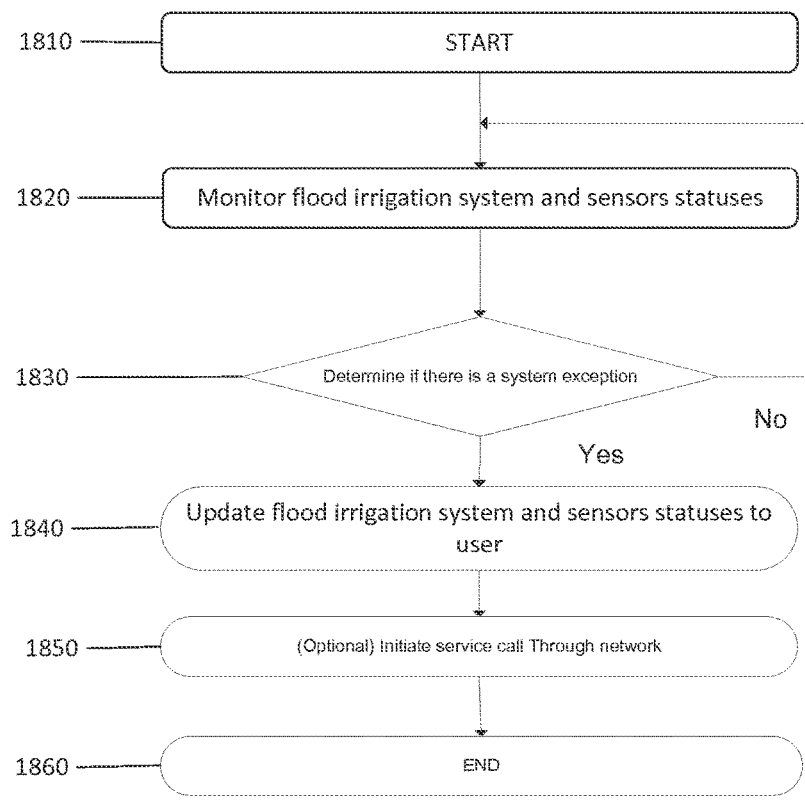
FIG. 18 illustrates an exemplary flow diagram of a service alert process for a flood irrigation system according to an embodiment.

FIG. 18 illustrates an exemplary flow diagram of a service alert process for a flood irrigation system according to an embodiment.

Referring to FIG. 18, at the start 1810 of the service alert process 1800, the flood irrigation system 1200 may be in active (e.g., the riser devices 1300 and the sensor devices 1400 are running) or dormant (e.g., the riser devices 1300 and the sensor devices 1400 are shut off) state. In an embodiment, the flood irrigation system 1200 may further include a number of other devices such as a surveillance system (e.g., an infrared camera for monitoring the area of the flood irrigation system 1200 at all times).

In step 1820, the flood irrigation system 1200 is monitored for system and sensors statuses. The sensors may include sensors on the riser device (e.g., water flow rate sensor 1313), the sensor device (e.g., water sensor 1411), the power sources (e.g., voltmeter on wind turbine 1231 or solar panel 1232), surveillance system (e.g., motion, infrared, and other sensors), or other devices.

Next, in decision diamond 1830, it is determined if there is any system exception. In an instance, an abnormal value for a sensor may indicate a malfunction of a device and may raise an exception. In another instance, a successful completion of a flood irrigation system programming may raise an exception designed to inform the user of the status and progress of the flood irrigation system. In an embodiment, the exceptions may be defined by the user and may include the achievement of any status or sensor values of the flood irrigation system.

Next, the service alert process 800 updates the flood irrigation system and the sensors statuses to the user 1840. For example, the user may define certain methods of communication to receive the service alert, including telephonic call, text, email, application alert (e.g., on a laptop mobile device), or other methods. In an embodiment, the flood irrigation system may send the service alert through the network 1101 or using the radio of the various devices. In an embodiment, the service alert may include visual, sound, text, or other data (e.g., from the surveillance system).

Next, the service alert process 1800 may optionally initiate a service call through the network 1850. For example, if the flood irrigation system or some components of the flood irrigation system are maintained or supported by a third party service other than the user, the flood irrigation system 1200 may send the service alert directly to the third party service (e.g., a malfunction of components of the flood irrigation system).

To avoid unnecessarily obscuring the present disclosure, the preceding description may omit a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as a discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes. e.g., for improving performance, achieving ease and/or reducing cost of implementation.

The foregoing discussion has been presented for purposes of illustration and description. The foregoing is not intended to limit the disclosure to the form or forms disclosed herein. In the foregoing description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this description, with each claim standing on its own as a separate preferred embodiment of the disclosure.

Moreover, though the description has included a description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A riser assembly, comprising:
   a support structure;
   an actuation mechanism coupled to the support structure for opening and closing a lid assembly, wherein the lid assembly impedes a flow of water from a riser valve in a closed position and releases the flow of water from the riser valve in an opened position; and
   an electronic control for controlling the actuation mechanism to open and close the lid assembly, the electronic control comprising:
   a processor; and
   a wireless communication interface; the wireless communication interface is configured to receive a signal from a corresponding sensor assembly when the corresponding sensor assembly senses a flood condition to control the actuation mechanism to close the lid assembly,
   wherein the actuation mechanism comprises a compressed gas mechanism,
   wherein the compressed gas mechanism comprises a compressed gas vessel, a gas regulator, and an air spring, wherein the air spring compresses to open the lid assembly and decompresses to close the lid assembly,
   wherein the riser assembly is deployed at a location proximate to the riser valve to release water of a water source from the riser valve for flooding a portion of a sloped field of a plurality of sloped fields, wherein the riser assembly is deployed at a higher end of the sloped field,
   wherein a flood irrigation system includes the riser assembly and one or more additional riser assemblies, the additional riser assemblies are each deployed at a location proximate to a corresponding riser value to release the water of the water source from the corresponding riser valve for flooding a portion of a corresponding sloped field of the plurality of sloped fields, wherein the additional riser assemblies are each deployed at a higher end of the corresponding sloped field,
   wherein a corresponding sensor device is deployed at a lower end of the corresponding sloped field and at a location proximate to where the water from the riser valve is expected to flood,
   wherein at most one riser assembly of the riser assembly and each of the additional riser assemblies is configured to release the water of the water source at a time in accordance to a pre-determined pattern.

2. The riser assembly of claim 1, further comprising a power supply.

3. The riser assembly of claim 1, wherein the gas regulator includes a solenoid, the solenoid controlling a path of gas from the compressed gas vessel for compressing or decompressing the air spring.

4. The riser assembly of claim 3, wherein the solenoid comprises a 3-way normally open (3WNO) magnetic latching solenoid valve.

5. A flood irrigation system comprising the riser assembly of claim 1 and the corresponding sensor assembly, wherein the riser assembly is deployed at a location proximate to the riser valve and the sensor assembly is deployed at a location proximate to where water from the riser valve is expected to flood.

6. A flood irrigation system, comprising:
   a plurality of riser devices; and
   a plurality of corresponding sensor devices each in wireless communication with one of the riser device, wherein
   each of the riser device is deployed at a location proximate to a riser valve to release water of a water source from the riser valve for flooding a portion of a corresponding sloped field of a plurality of sloped fields, wherein the riser device is deployed at a higher end of the corresponding sloped field, wherein
   the corresponding sensor device is deployed at a lower end of the corresponding sloped field and at a location proximate to where the water from the riser valve is expected to flood, wherein
   the corresponding sensor device is configured to send a wireless signal to the riser device that the corresponding sensor device is in wireless communication with to stop releasing the water when the corresponding sensor device senses a flood condition, wherein
   at least one of the riser devices is in wireless communication with at least another one of the riser devices, and wherein the one riser device is configured to send a wireless signal to the another one riser device to release water from the riser valve corresponding to the another one riser device when the one riser device stops releasing the water, and wherein
   at most one of the riser devices of the system is configured to release the water of the water source at a time.

7. The flood irrigation system of claim 6, wherein the another one riser device is in wireless communication with a second one of the riser devices, and wherein the another one riser device is configured to send a wireless signal to the second one riser device to release water from the riser valve corresponding to the second one riser device when the another one riser device stops releasing the water in accordance to a pre-determined pattern.

8. The flood irrigation system of claim 6, wherein at least one of the riser devices comprises:
- a support structure;
- an actuation mechanism coupled to the support structure for opening and closing a lid assembly, wherein the lid assembly impedes a flow of water from the riser valve corresponding to the riser device in a closed position and releases the flow of water from the riser valve in an opened position; and
- an electronic control for controlling the actuation mechanism to open and close the lid assembly, the electronic control comprising:
  - a processor; and
  - a wireless communication interface; the wireless communication interface is configured to receive the wireless signal from the corresponding sensor device.

9. The flood irrigation system of claim 8, wherein the actuation mechanism comprises one of a motor driven screw mechanism and a scissor jack mechanism.

10. The flood irrigation system of claim 8, wherein the actuation mechanism comprises a compressed gas vessel, a gas regulator, and an air spring, wherein the air spring compresses to open the lid assembly and decompresses to close the lid assembly.

11. The flood irrigation system of claim 10, wherein the gas regulator includes a solenoid, the solenoid controlling a path of gas from the compressed gas vessel for compressing or decompressing the air spring.

12. The flood irrigation system of claim 11, wherein the solenoid comprises a 3-way normally open (3WNO) magnetic latching solenoid valve.

13. A method for flood irrigation, comprising (A)-(E):
(A) transmitting a signal to a first riser device for controlling a release of water of a water source from a first riser valve of the first riser device of a plurality of riser devices for flooding a portion of a first sloped field of a plurality of sloped fields, wherein the first riser device is deployed at a higher end of the first sloped field;
(B) subsequently, receiving a wireless signal from a first sensor device of a plurality of sensor devices for a detection of a flood condition, wherein the first sensor device is deployed at a lower end of the first sloped field and at a location proximate to where the water released from the first riser valve is expected to flood;
(C) subsequently, transmitting a signal to the first riser device for controlling a stop of the release of the water from the first riser valve;
(D) subsequently, performing the following (a)-(c) for a next riser device of the plurality of riser devices, a next sensor device of the plurality of sensor devices, and a next sloped field of the plurality of sloped fields:
  (a) subsequently, transmitting a signal to the next riser device for controlling a release of water of the water source from the next riser valve of the next riser device for flooding a portion of a next sloped field of the plurality of sloped fields, wherein the next riser device is deployed at a higher end of the next sloped field;
  (b) subsequently, receiving a wireless signal from the next sensor device for a detection of a flood condition, wherein the next sensor device is deployed at a lower end of the next sloped field and at a location proximate to where the water released from the next riser valve is expected to flood; and
  (c) subsequently, transmitting a signal to the next riser device for controlling a stop of the release of the water from the next riser valve; and
(E) repeating (D) for another riser device of the plurality of riser devices as the next riser device, another sensor device of the plurality of sensor devices as the next sensor device, and another sloped field of the plurality of sloped fields as the next sloped field until a last riser device of the plurality of riser devices, a last sensor device of the plurality of sensor devices, and a last sloped field of the plurality of sloped fields based on a sequence comprising a pre-determined pattern.

14. The method for flood irrigation of claim 13, wherein the sequence comprises an ordering starting from a first one of the riser devices to a last one of the riser devices.

15. The method for flood irrigation of claim 13, wherein the first riser device comprises:
- a support structure;
- an actuation mechanism coupled to the support structure for opening and closing a lid assembly, wherein the lid assembly impedes a flow of the water from the first riser valve in a closed position and releases the flow of the water from the first riser valve in an opened position; and
- an electronic control for controlling the actuation mechanism to open and close the lid assembly, the electronic control comprising:
  - a processor; and
  - a wireless communication interface; the wireless communication interface is configured to receive the wireless signal.

16. The method for flood irrigation of claim 15, wherein the actuation mechanism comprises a compressed gas vessel, a gas regulator, and an air spring, wherein the air spring compresses to open the lid assembly and decompresses to close the lid assembly.

17. The method for flood irrigation of claim 16, wherein the gas regulator includes a solenoid, the solenoid controlling a path of gas from the compressed gas vessel for compressing or decompressing the air spring.

18. The method of claim 13, further comprising, responsive to a determination that a pre-determined time has elapsed without a transmission from the next sensor device for the detection of the flood condition, transmitting a signal to the next riser device for controlling a stop of the release of the water from the next riser valve.

19. The method of claim 13, further comprising, responsive to a determination that a pre-determined time has elapsed from the release of water from the next riser valve, transmitting a signal to the next riser device for controlling a stop of the release of the water from the next riser valve.

20. The method of claim 13, further comprising, responsive to a determination that an exception has occurred with one of the riser devices and the sensor devices, transmitting a signal for a service call of the exception through a network.

* * * * *